United States Patent
Cezanne et al.

(10) Patent No.: US 10,425,878 B2
(45) Date of Patent: Sep. 24, 2019

(54) TECHNIQUES TO IDENTIFY SETS OF MULTIPLE BEAMS COMPATIBLE WITH CONFIGURATIONS FOR ROUTING SIGNALS IN A USER EQUIPMENT

(71) Applicant: QUALCOMM Incorporated, San Diego, CA (US)

(72) Inventors: Juergen Cezanne, Ocean Township, NJ (US); Vasanthan Raghavan, West Windsor Township, NJ (US); Sundar Subramanian, Bridgewater, NJ (US); Ashwin Sampath, Skillman, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/713,494

(22) Filed: Sep. 22, 2017

(65) Prior Publication Data
US 2018/0199258 A1    Jul. 12, 2018

Related U.S. Application Data

(60) Provisional application No. 62/444,325, filed on Jan. 9, 2017.

(51) Int. Cl.
*H04W 40/06* (2009.01)
*H01Q 21/00* (2006.01)
(Continued)

(52) U.S. Cl.
CPC .............. *H04W 40/06* (2013.01); *H01Q 3/24* (2013.01); *H01Q 21/0025* (2013.01);
(Continued)

(58) Field of Classification Search
CPC ............ H04W 40/06; H04W 72/0453; H04W 72/048; H04W 72/046; H01Q 21/0025;
(Continued)

(56) References Cited

U.S. PATENT DOCUMENTS

| 2009/0121935 A1* | 5/2009 | Xia ...................... H01Q 3/2605 342/377 |
| 2011/0237196 A1* | 9/2011 | Niu ...................... H04B 7/0691 455/62 |

(Continued)

OTHER PUBLICATIONS

International Search Report and Written Opinion—PCT/US2017/068509—ISA/EPO—dated Mar. 20, 2018.

*Primary Examiner* — Obaidul Huq
(74) *Attorney, Agent, or Firm* — Holland & Hart LLP

(57) ABSTRACT

Techniques are described for wireless communication. A method for wireless communication at a user equipment (UE) may include receiving a beam training sequence transmitted by a network access device on a plurality of transmit beams, identifying, based at least in part on the received beam training sequence, one or more sets of multiple beams that are compatible with at least one configuration for routing signals between antenna subarrays of the UE and transceiver units (TXRUs) of the UE, and transmitting, to the network access device, an indication of the identified one or more sets of multiple beams. A method for wireless communication at the network device may include transmitting the beam training sequence, receiving the indication, and selecting, based at least in part on the received indication, a set of multiple beams of the one or more sets of multiple beams to use to communicate with the UE.

31 Claims, 19 Drawing Sheets

(51) Int. Cl.
  *H04B 7/0408* (2017.01)
  *H04W 72/04* (2009.01)
  *H04B 7/06* (2006.01)
  *H04B 7/0413* (2017.01)
  *H04B 7/0404* (2017.01)
  *H01Q 3/24* (2006.01)

(52) U.S. Cl.
  CPC ......... *H04B 7/0404* (2013.01); *H04B 7/0408* (2013.01); *H04B 7/0413* (2013.01); *H04B 7/0617* (2013.01); *H04B 7/0691* (2013.01); *H04B 7/0695* (2013.01); *H04W 72/048* (2013.01); *H04W 72/0453* (2013.01); *H04W 72/046* (2013.01)

(58) Field of Classification Search
  CPC ...... H01Q 3/24; H04B 7/0408; H04B 7/0413; H04B 7/0691; H04B 7/0404; H04B 7/0617; H04B 7/0695
  USPC .......................................... 370/310, 315, 316
  See application file for complete search history.

(56) References Cited

U.S. PATENT DOCUMENTS

| | | | |
|---|---|---|---|
| 2012/0122392 A1* | 5/2012 | Morioka | H04B 7/0695 455/25 |
| 2013/0223251 A1 | 8/2013 | Li et al. | |
| 2013/0301454 A1 | 11/2013 | Seol et al. | |
| 2015/0289147 A1* | 10/2015 | Lou | H04B 7/0408 370/329 |
| 2015/0333811 A1* | 11/2015 | Yu | H04B 7/0617 370/329 |

* cited by examiner

TECHNIQUES TO IDENTIFY SETS OF MULTIPLE BEAMS COMPATIBLE WITH CONFIGURATIONS FOR ROUTING SIGNALS IN A USER EQUIPMENT

CROSS REFERENCES

The present Application for Patent claims priority to U.S. Provisional Patent Application No. 62/444,325 by Cezanne et al., entitled "TECHNIQUES TO IDENTIFY SETS OF MULTIPLE BEAMS COMPATIBLE WITH CONFIGURATIONS FOR ROUTING SIGNALS IN A USER EQUIPMENT," filed Jan. 9, 2017, assigned to the assignee hereof, and which is hereby expressly incorporated by reference herein in its entirety.

BACKGROUND

Field of the Disclosure

The present disclosure, for example, relates to wireless communications systems, and more particularly to techniques to identify one or more sets of multiple beams that are compatible with at least one configuration for routing signals between antenna subarrays of a user equipment (UE) and transceiver units (TXRUs) of the UE.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

A wireless multiple-access communication system may include a number of network access devices, each simultaneously supporting communication for multiple communication devices, otherwise known as user equipment (UEs). In a Long-Term Evolution (LTE) or LTE-Advanced (LTE-A) network, a network access device may take the form of a base station, with a set of one or more base stations defining an eNodeB (eNB). In a next generation, 3GPP 5G, millimeter wave (mmW), or new radio (NR) network, a network access device may take the form of a smart radio head (RH) or access node controller (ANC), with a set of smart radio heads in communication with an ANC defining a gNodeB (gNB). In a wireless local area network (WLAN), a network access device may take the form of a WLAN access point. A network access device may communicate with a UE on downlink channels (e.g., for transmissions from the network access device to the UE) and uplink channels (e.g., for transmissions from the UE to the network access device).

Some wireless devices (UEs, network access devices, etc.) may communicate with other wireless devices using one or more antenna subarrays. In some examples, some or all of the antennas in an antenna subarray may be used to transmit a beamformed transmission. A beamformed transmission may include a plurality of simultaneous transmissions from different antennas of an antenna subarray. The simultaneous transmissions may be phase-shifted and/or power controlled, in accordance with a precoder, to constructively and destructively interfere and produce the beamformed transmission (i.e., a transmission in the direction of a beam). In comparison to a non-beamformed or omnidirectional transmission, a beamformed transmission may have a higher radio frequency (RF) transmit power density in the direction of the beam, which can reduce path loss.

SUMMARY

In a wireless communications system including network access devices and user equipments (UEs) that communicate using beamformed transmissions, a network access device may transmit a beam training sequence to a UE on a plurality of transmit beams. The UE may perform measurements on the beams (e.g., reference signal received power (RSRP) measurements, received signal strength indicator (RSSI) measurements, reference signal received quality (RSRQ) measurements, etc.), identify one or more beams usable for communication between the network access device and the UE based at least in part on the measurements, and provide an indication of the one or more usable beams to the network access device. The indication of the one or more usable beams may be used by the network access device to schedule rank-1 transmissions without diversity. However, the indication of the one or more usable beams may not be sufficient to enable the network access device to identify a set of multiple beams usable for higher rank transmissions (e.g., multiple-input multiple-output (MIMO) transmissions with multiplexing gain) or transmissions with diversity (e.g., MIMO transmissions with diversity gain), and the network access device may therefore test different sets of the usable beams (using test transmissions) to identify a set of multiple beams usable for multiplexing or diversity gain. The UE may have multiple antenna subarrays, each of which may be routed to one or more transceiver units (TXRUs). The UE may have multiple configurations for routing signals between antenna subarrays of the UE and TXRUs of the UE, between which it may switch, for routing signals between the antenna subarrays and the TXRUs. According to techniques described in the present disclosure, a UE may identify, based at least in part on measurements that it has performed on the beams of a beam training sequence, one or more sets of multiple beams that are compatible with at least one of these routing configurations. The UE may also transmit an indication of the identified one or more sets of multiple beams to the network access device, to enable the network access device to identify a set of multiple beams usable to communicate with the UE, for example without making test transmissions on random sets of multiple beams. The network access device and the UE may communicate according to MIMO transmissions, perform a beam refinement procedure, or take other actions based at least in part on the identified set of multiple beams.

In one example, an apparatus for wireless communication at a UE is described. The method may include receiving a beam training sequence transmitted by a network access device on a plurality of transmit beams, identifying, based at least in part on the received beam training sequence, one or more sets of multiple beams that are compatible with at least one configuration for routing signals between antenna subarrays of the UE and TXRUs of the UE, and transmitting, to the network access device, an indication of the identified one or more sets of multiple beams.

An apparatus for wireless communication is described. The apparatus may include means for receiving a beam training sequence transmitted by a network access device on a plurality of transmit beams, means for identifying, based at least in part on the received beam training sequence, one or more sets of multiple beams that are compatible with at least one configuration for routing signals between antenna subarrays of the apparatus and TXRUs of the apparatus, and means for transmitting, to the network access device, an indication of the identified one or more sets of multiple beams.

Another apparatus for wireless communication is described. The apparatus may include a processor, memory in electronic communication with the processor, and instructions stored in the memory. The instructions may be operable to cause the processor to receive a beam training sequence transmitted by a network access device on a plurality of transmit beams, identify, based at least in part on the received beam training sequence, one or more sets of multiple beams that are compatible with at least one configuration for routing signals between antenna subarrays of the apparatus and TXRUs of the apparatus, and transmit, to the network access device, an indication of the identified one or more sets of multiple beams.

A non-transitory computer readable medium for wireless communication is described. The non-transitory computer-readable medium may include instructions operable to cause a processor to receive a beam training sequence transmitted by a network access device on a plurality of transmit beams, identify, based at least in part on the received beam training sequence, one or more sets of multiple beams that are compatible with at least one configuration for routing signals between antenna subarrays of the UE and TXRUs of the UE, and transmit, to the network access device, an indication of the identified one or more sets of multiple beams.

Some examples of the method, apparatus, and non-transitory computer-readable medium described above may include communicating with the network access device using a MIMO transmission based at least in part on a set of multiple beams identified by the indication of the one or more sets of multiple beams. Some examples of the method, apparatus, and non-transitory computer-readable medium described above may include performing a beam refinement procedure with the network access device based at least in part on a set of multiple beams identified by the indication of the one or more sets of multiple beams. Some examples of the method, apparatus, and non-transitory computer-readable medium described above may include transmitting, to the network access device, a request to perform the beam refinement procedure. In some examples, identifying the one or more sets of multiple beams may include identifying, based at least in part on the received beam training sequence, a first set of multiple beams usable to provide radio frequency (RF) communication multiplexing, a second set of multiple beams usable to provide RF communication diversity, or a combination thereof. In some examples, the indication of the identified one or more sets of multiple beams may include at least a first indication of the identified one or more sets of multiple beams; a second indication of one or more sets of multiple beams that are incompatible with any configuration for routing signals between antenna subarrays of the UE and TXRUs of the UE; a third indication, for each received beam of the plurality of transmit beams, of a set of one or more TXRUs of the UE usable to receive the beam; a fourth indication, for each received beam of the plurality of transmit beams, of a set of one or more TXRUs of the UE and associated routing configuration parameters of the UE usable to receive the beam; or a combination thereof. In some examples, transmitting the indication of the identified one or more sets of multiple beams may include transmitting the indication of the identified one or more sets of multiple beams to the network access device on a channel associated with a lower frequency than one or more frequencies associated with the plurality of transmit beams.

In some examples of the method, apparatus, and non-transitory computer-readable medium described above, identifying the one or more sets of multiple beams may include identifying the one or more sets of multiple beams based at least in part on a RF architecture of the UE, a MIMO transmission mode, signal strengths for the plurality of transmit beams, or a combination thereof. In some examples, identifying the one or more sets of multiple beams based at least in part on the RF architecture of the UE may include identifying the one or more sets of multiple beams based at least in part on alternative configurations for routing signals between antenna subarrays of the UE and TXRUs of the UE, a first capability of the UE to combine beams in an analog domain, a second capability of the UE to combine beams in a digital domain, or a combination thereof. Some examples of the method, apparatus, and non-transitory computer-readable medium described above may include identifying, based at least in part on the plurality of transmit beams of the received beam training sequence, one or more beams usable for communication between the network access device and the UE; and transmitting, to the network access device, a second indication of the identified set of one or more beams usable for communication between the network access device and the UE. In some examples, the one or more sets of multiple beams may be usable in a receive configuration for routing signals between antenna subarrays of the UE and TXRUs of the UE, a transmit configuration for routing signals between TXRUs of the UE and antenna subarrays of the UE, or a combination thereof.

In one example, an apparatus for wireless communication at a UE is described. The apparatus may include means for receiving a beam training sequence transmitted by a network access device on a plurality of transmit beams; means for identifying, based at least in part on the received beam training sequence, one or more sets of multiple beams that are compatible with at least one configuration for routing signals between antenna subarrays of the UE and TXRUs of the UE; and means for transmitting, to the network access device, an indication of the identified one or more sets of multiple beams.

In some examples, the apparatus may include means for communicating with the network access device using a MIMO transmission based at least in part on a set of multiple beams identified by the indication of the one or more sets of multiple beams. In some examples, the apparatus may include means for performing a beam refinement procedure with the network access device based at least in part on a set of multiple beams identified by the indication of the one or more sets of multiple beams. In some examples, the means for identifying the one or more sets of multiple beams may include means for identifying, based at least in part on the received beam training sequence, a first set of multiple beams usable to provide RF communication multiplexing, a second set of multiple beams usable to provide RF communication diversity, or a combination thereof. In some examples, the indication of the identified one or more sets of multiple beams may include at least a first indication of the identified one or more sets of multiple beams; a second indication of one or more sets of multiple beams that are incompatible with any configuration for routing signals between antenna subarrays of the UE and TXRUs of the UE; a third indication, for each received beam of the plurality of transmit beams, of a set of one or more TXRUs of the UE usable to receive the beam; a fourth indication, for each received beam of the plurality of transmit beams, of a set of one or more TXRUs of the UE and associated routing configuration parameters of the UE usable to receive the beam; or a combination thereof. In some examples, the means for identifying the one or more sets of multiple beams may include means for identifying the one or more sets of multiple beams based at least in part on a RF architecture of the UE, a MIMO transmission mode, signal strengths for the plurality of transmit beams, or a combination thereof.

In one example, a method for wireless communication at a network access device is described. The method may include transmitting a beam training sequence to a UE on a plurality of transmit beams, receiving, from the UE, an indication of one or more sets of multiple beams that are compatible with at least one configuration for routing signals between antenna subarrays of the UE and TXRUs of the UE, and selecting, based at least in part on the received indication, a set of multiple beams of the one or more sets of multiple beams to use to communicate with the UE.

An apparatus for wireless communication is described. The apparatus may include means for transmitting a beam training sequence to a UE on a plurality of transmit beams, means for receiving, from the UE, an indication of one or more sets of multiple beams that are compatible with at least one configuration for routing signals between antenna subarrays of the UE and TXRUs of the UE, and means for selecting, based at least in part on the received indication, a set of multiple beams of the one or more sets of multiple beams to use to communicate with the UE.

Another apparatus for wireless communication is described. The apparatus may include a processor, memory in electronic communication with the processor, and instructions stored in the memory. The instructions may be operable to cause the processor to transmit a beam training sequence to a UE on a plurality of transmit beams, receive, from the UE, an indication of one or more sets of multiple beams that are compatible with at least one configuration for routing signals between antenna subarrays of the UE and TXRUs of the UE, and select, based at least in part on the received indication, a set of multiple beams of the one or more sets of multiple beams to use to communicate with the UE.

A non-transitory computer readable medium for wireless communication is described. The non-transitory computer-readable medium may include instructions operable to cause a processor to transmit a beam training sequence to a UE on a plurality of transmit beams, receive, from the UE, an indication of one or more sets of multiple beams that are compatible with at least one configuration for routing signals between antenna subarrays of the UE and TXRUs of the UE, and select, based at least in part on the received indication, a set of multiple beams of the one or more sets of multiple beams to use to communicate with the UE.

Some examples of the method, apparatus, and non-transitory computer-readable medium described above may include communicating with the UE using a MIMO transmission based at least in part on the selected set of multiple beams. Some examples of the method, apparatus, and non-transitory computer-readable medium described above may include performing a beam refinement procedure with the UE based at least in part on the selected set of multiple beams. Some examples of the method, apparatus, and non-transitory computer-readable medium described above may further include processes, features, means, or instructions for receiving, from the UE, a request to perform the beam refinement procedure.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Techniques are described in which a user equipment (UE) identifies, and indicates to a network access device, one or more sets of multiple beams that are compatible with at least one configuration for routing signals between antenna subarrays of the UE and transceiver units (TXRUs) of the UE. The network access device may select a set of multiple beams from the one or more sets of multiple beams, and may use the selected set of multiple beams, for example, to communicate with the UE using a multiple-input multiple-output (MIMO) transmission (with multiplexing gain and/or diversity gain), or to perform a beam refinement procedure for the selected set of multiple beams.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various operations may be added, omitted, or combined. Also, features described with respect to some examples may be combined in some other examples.

Figure 1:
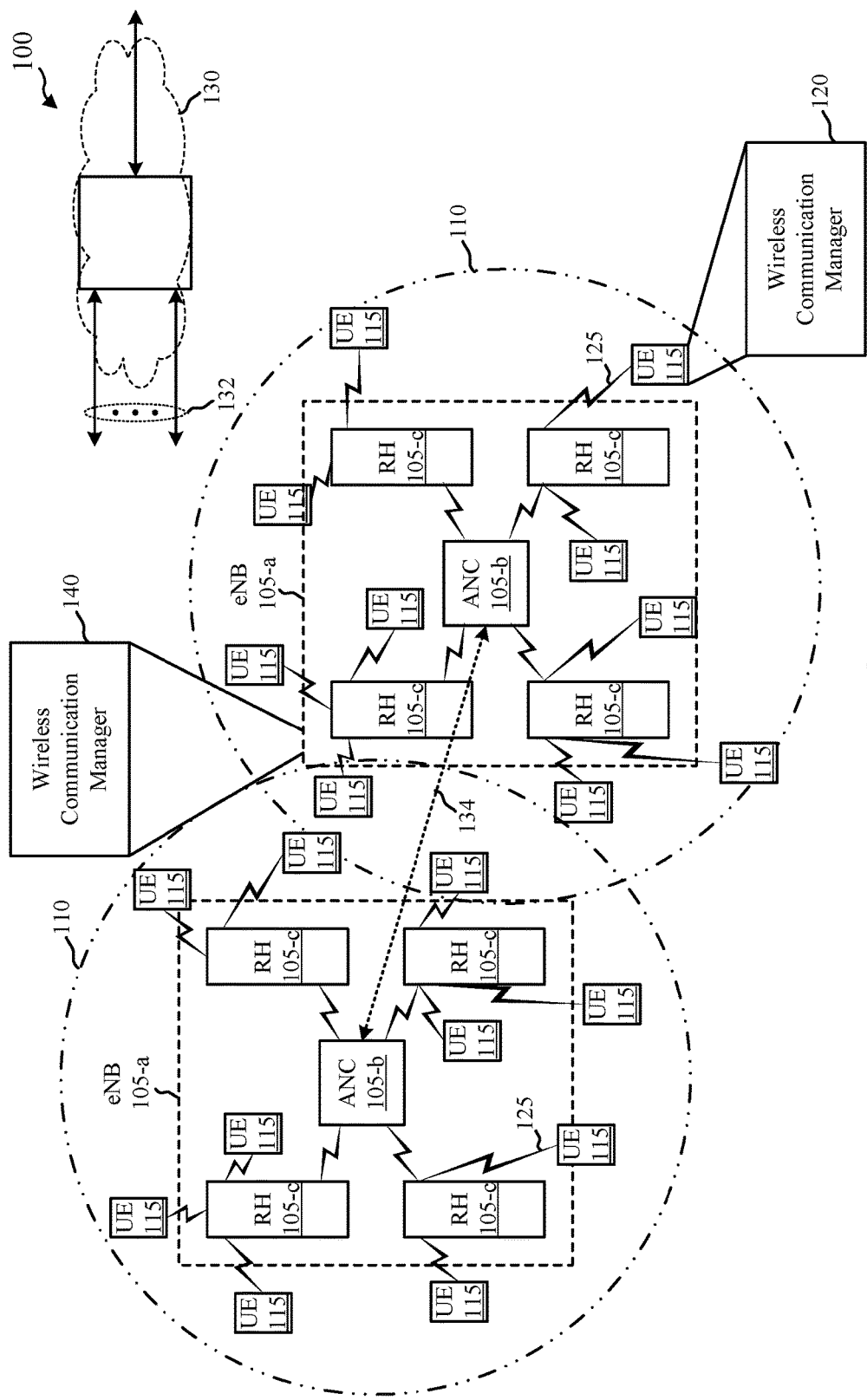
FIG. 1 shows an example of a wireless communications system, in accordance with aspects of the present disclosure.

FIG. 1 shows an example of a wireless communications system 100, in accordance with aspects of the present disclosure. The wireless communications system 100 may include network access devices 105 (e.g., gNBs 105-*a*, access node controllers (ANCs) 105-*b*, and/or radio heads (RHs) 105-*c*), UEs 115, and a core network 130. In some examples, the wireless communications system 100 may be a Long-Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Network access devices 105 may wirelessly communicate with UEs 115 via one or more base station antennas. Network access devices 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include network access devices 105 of different types (e.g., macro or small cell base stations). The UEs 115 described herein may be able to communicate with various types of network access device 105 and base stations including macro eNBs, small cell eNBs, gNBs, relay base stations, and the like.

Each network access device 105 may be associated with a particular geographic coverage area 110 in which communications with various UEs 115 is supported. Each network access device 105 may provide communication coverage for a respective geographic coverage area 110 via communication links, and communication links between a network access device 105 and a UE 115 may utilize one or more carriers. Communication links shown in wireless communications system 100 may include uplink transmissions from a UE 115 to a network access device 105, or downlink transmissions, from a network access device 105 to a UE 115. Downlink transmissions may also be called forward link transmissions while uplink transmissions may also be called reverse link transmissions.

The geographic coverage area 110 for a network access device 105 may be divided into sectors making up only a portion of the geographic coverage area 110, and each sector may be associated with a cell. For example, each network access device 105 may provide communication coverage for a macro cell, a small cell, a hot spot, or other types of cells, or various combinations thereof. In some examples, a network access device 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same network access device 105 or by different network access devices 105. The wireless communications system 100 may include, for example, a heterogeneous LTE/LTE-A or NR network in which different types of network access devices 105 provide coverage for various geographic coverage areas 110.

The term "cell" refers to a logical communication entity used for communication with a network access device 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Universal Terrestrial Radio Access (UTRA) (E-UTRA) absolute radio frequency channel number (EARFCN)), and may be positioned according to a channel raster for discovery by UEs 115. Carriers may be downlink or uplink (e.g., in an Frequency Division Duplexing (FDD) mode), or be configured to carry downlink and uplink communications (e.g., in a time-division duplexing (TDD) mode). In some examples, signal waveforms transmitted over a carrier may be made up of multiple subcarriers (e.g., using multi-carrier modulation (MCM) techniques such as orthogonal frequency-division multiplexing (OFDM) or discrete Fourier transform (DFT) spread OFDM (DFT-s-OFDM)).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by network access devices 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network access devices 105 (e.g., gNBs 105-a or ANCs 105-b) may interface with the core network 130 through backhaul links 132 (e.g., S1, S2, etc.) and may perform radio configuration and scheduling for communication with the UEs 115. In various examples, the ANCs 105-b may communicate, either directly or indirectly (e.g., through core network 130), with each other over backhaul links 134 (e.g., X1, X2, etc.), which may be wired or wireless communication links. Each ANC 105-b may also communicate with a number of UEs 115 through a number of smart radio heads (e.g., RHs 105-c) or a transmission/reception point (TRP). In an alternative configuration of the wireless communications system 100, the functionality of an ANC 105-b may be provided by a radio head 105-c or distributed across the radio heads 105-c of an gNB 105-a. In another alternative configuration of the wireless communications system 100 (e.g., an LTE/LTE-A configuration), the radio heads 105-c may be replaced with base stations, and the ANCs 105-b may be replaced by base station controllers (or links to the core network 130). In some examples, the wireless communications system 100 may include a mix of radio heads 105-c, base stations, and/or other network access devices 105 for receiving/transmitting communications according to different radio access technologies (RATs) (e.g., LTE/LTE-A, 5G, Wi-Fi, etc.).

Wireless communications system 100 may operate using one or more frequency spectrum bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency spectrum bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and network access devices 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

A macro cell may cover a relatively large geographic area (e.g., several kilometers in radius) and may allow unrestricted access by UEs 115 with service subscriptions with a network provider. A small cell may include a lower-powered radio head or base station, as compared with a macro cell, and may operate in the same or different radio frequency spectrum band(s) as macro cells. Small cells may include pico cells, femto cells, and micro cells according to various examples. A pico cell may cover a relatively smaller geographic area and may allow unrestricted access by UEs 115 with service subscriptions with a network provider. A femto cell also may cover a relatively small geographic area (e.g., a home) and may provide restricted access by UEs 115 having an association with the femto cell (e.g., UEs in a closed subscriber group (CSG), UEs for users in the home, and the like). A gNB for a macro cell may be referred to as a macro gNB. A gNB for a small cell may be referred to as a small cell gNB, a pico gNB, a femto gNB or a home gNB. A gNB may support one or multiple (e.g., two, three, four, and the like) cells (e.g., component carriers).

The wireless communications system 100 may support synchronous or asynchronous operation. For synchronous operation, the gNBs 105-a and/or radio heads 105-c may have similar frame timing, and transmissions from different gNBs 105-a and/or radio heads 105-c may be approximately aligned in time. For asynchronous operation, the gNBs 105-a and/or radio heads 105-c may have different frame timings, and transmissions from different gNBs 105-a and/or radio heads 105-c may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (ARQ) (HARD) to provide retransmission at the MAC layer to improve link efficiency. In the control plane, the Radio Resource Control (RRC) protocol layer may provide establishment, configuration, and maintenance of an RRC connection between a UE 115 and a radio head 105-c, ANC 105-b, or core network 130 supporting radio bearers for user plane data. At the Physical (PHY) layer, transport channels may be mapped to physical channels.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology, where the "device" may also be referred to as a unit, a station, a terminal, or a client. A UE 115 may be a cellular phone, a personal digital assistant (PDA), a wireless modem, a wireless communication device, a handheld device, a tablet computer, a laptop computer, a cordless phone, a wireless local loop (WLL) station, an Internet of Everything (IoE) device, an Internet of Everything (IoE) device, or an MTC device, or the like, which may be implemented in various articles such as appliances, vehicles, meters, or the like. A UE 115 may be able to communicate with various types of gNBs 105-a, radio heads 105-c, base stations, access points, or other network access devices, including macro gNBs, small cell gNBs, relay base stations, and the like.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a network access device 105. Other UEs 115 in such a group may be outside the geographic coverage area 110 of a network access device 105, or be otherwise unable to receive transmissions from a network access device 105. In some cases, groups of UEs 115 communicating via D2D communications may utilize a one-to-many (1:M) system in which each UE 115 transmits to every other UE 115 in the group. In some cases, a network access device 105 facilitates the scheduling of resources for D2D communications. In other cases, D2D communications are carried out between UEs 115 without the involvement of a network access device 105

The communication links 125 shown in wireless communications system 100 may include uplinks (ULs) from a UE 115 to a radio head 105-c, and/or downlinks (DLs), from a radio head 105-c to a UE 115. The downlinks may also be called forward links, while the uplinks may also be called reverse links. Control information and data may be multiplexed on an uplink or downlink according to various techniques. Control information and data may be multiplexed on an uplink or downlink, for example, using TDM techniques, frequency-division multiplexing (FDM) techniques, or hybrid TDM-FDM techniques.

Each communication link 125 may include one or more carriers, where each carrier may be a signal made up of multiple sub-carriers (e.g., waveform signals of different frequencies) modulated according to one or more radio access technologies. Each modulated signal may be sent on a different sub-carrier and may carry control information (e.g., reference signals, control channels, etc.), overhead information, user data, etc. The communication links 125 may transmit bidirectional communications using FDD techniques (e.g., using paired spectrum resources) or Time Division Duplexing techniques (e.g., using unpaired spectrum resources). Frame structures for FDD (e.g., frame structure type 1) and TDD (e.g., frame structure type 2) may be defined.

In some examples of the wireless communications system 100, network access devices 105 (e.g., radio heads 105-c) and UEs 115 may include multiple antenna subarrays which may be used to employ techniques such as transmit diversity, receive diversity, MIMO communications, and/or beamforming to improve communication quality and reliability between network access devices 105 and UEs 115. For example, wireless communications system 100 may use a transmission scheme between a transmitting device (e.g., a network access device 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices. Additionally or alternatively, network access devices 105 and UEs 115 may employ MIMO techniques that may take advantage of multi-path environments to transmit multiple spatial layers carrying the same or different coded data. In some cases, signal processing techniques such as beamforming (e.g., directional transmission) may be used with MIMO techniques to coherently combine signal energies and overcome the path loss in specific beam directions. Precoding (e.g., weighting transmissions on different paths or layers, or from different antennas) may be used in conjunction with MIMO or beamforming techniques.

A receiving device (e.g., a UE 115, which may be an example of a mmW receiving device) may try multiple receive beams when receiving various signals from the network access device 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a network access device 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a network access device 105 may be located in diverse geographic locations. A network access device 105 may have an antenna array with a number of rows and columns of antenna ports that the network access device 105 may use to support beamforming of communications with a UE 115. Likewise, a UE 115 may have one or more antenna arrays that may support various MIMO or beamforming operations.

The wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs according to a carrier aggregation configuration. Carrier aggregation may be used with both FDD and TDD component carriers. A UE 115 may be configured with multiple downlink CCs and one or more uplink CCs for carrier aggregation. Carrier aggregation may be used with both FDD and TDD component carriers.

In some examples, a UE 115 may include a wireless communication manager 120. The wireless communication manager 120 may be used to receive a beam training sequence transmitted by a network access device 105 on a plurality of transmit beams. The wireless communication manager 120 may also be used to identify, based at least in part on the received beam training sequence, one or more sets of multiple transmit beams that are compatible with at least one configuration for routing signals between antenna subarrays of the UE 115 and TXRUs of the UE 115. The wireless communication manager 120 may be further used to transmit, to the network access device 105, an indication of the identified one or more sets of multiple transmit beams.

In some examples, a network access device 105 may include a wireless communication manager 140. The wireless communication manager 140 may be used to transmit a beam training sequence to a UE 115 on a plurality of transmit beams. The wireless communication manager 140 may also be used to receive, from the UE 115, an indication of one or more sets of multiple transmit beams that are compatible with at least one configuration for routing signals between antenna subarrays of the UE 115 and TXRUs of the UE 115. The wireless communication manager 140 may be further used to select, based at least in part on the received indication, a set of multiple beams of the one or more sets of multiple beams to use to communicate with the UE 115.

Figure 2:
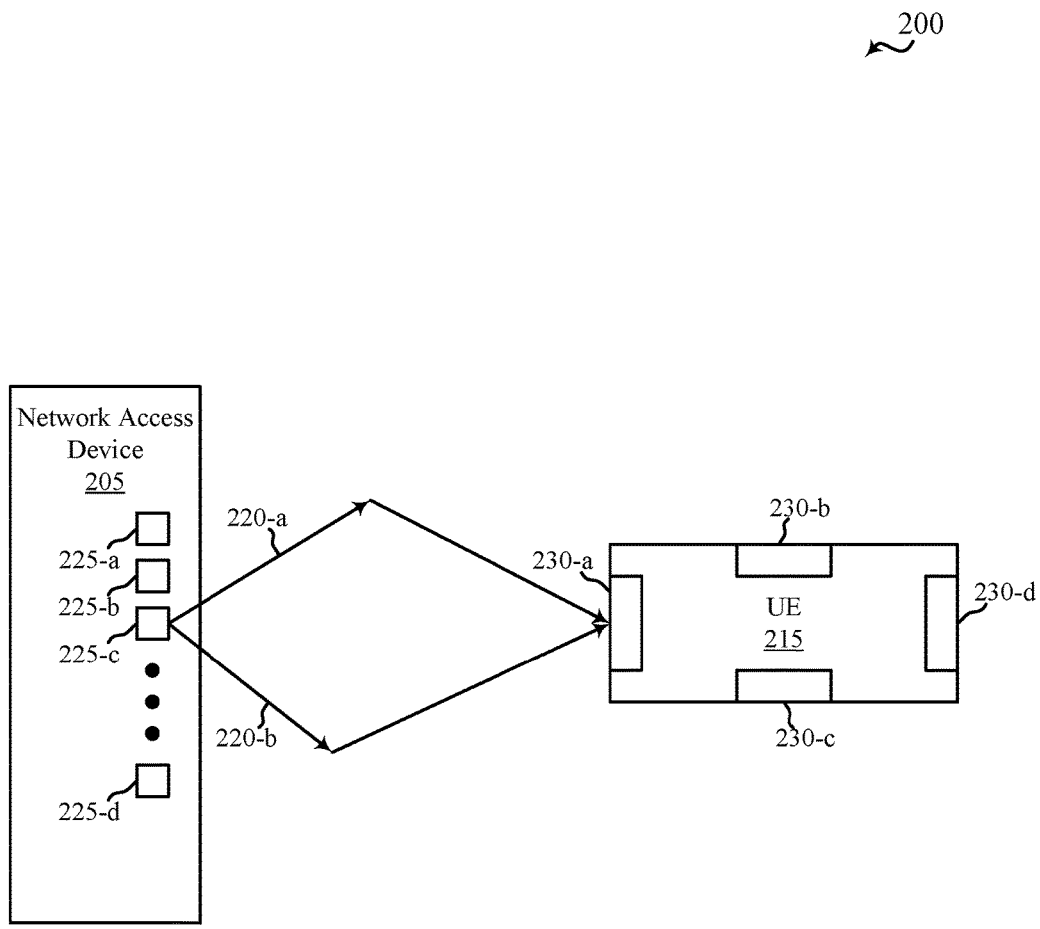
FIG. 2 shows an example of a wireless communications system, in accordance with aspects of the present disclosure.

FIG. 2 shows an example of a wireless communications system 200, in accordance with aspects of the present disclosure. The wireless communications system 200 may include a network access device 205 (e.g., a gNB, ANC, and/or RH) and a UE 215. The wireless communications system 200, network access device 205, and UE 215 may be examples of aspects of the wireless communications system, network access devices, and UEs as described with reference to FIG. 1. In some examples, the network access device 205 may be a millimeter wave base station (MWB).

The network access device 205 may transmit to the UE 215 on transmit beams 220 (e.g., a first transmit beam 220-a and a second transmit beam 220-b). Transmit beams 220 may be transmitted from one or more of a number of antenna subarrays 225 (e.g., a first antenna subarray 225-a, a second antenna subarray 225-b, a third antenna subarray 225-c, and a fourth antenna subarray 225-d). Transmit beams 220 may be received, at the UE 215, at one or more of a number of antenna subarrays 230 (e.g., a first antenna subarray 230-a, a second antenna subarray 230-b, a third antenna subarray 230-c, and a fourth antenna subarray 230-d). In some examples, the network access device 205 and UE 215 may have different numbers of antenna subarrays. The antenna subarrays 225 of the network access device 205 may have different positions, orientations, or polarizations on the network access device 205, and the antenna subarrays 230 of the UE 215 may have different positions, orientations, or polarizations on the UE 215.

Under some conditions, one or more of the antenna subarrays 230 may be blocked (e.g., the fourth antenna subarray 230-d may be blocked by a hand of a user of the UE 215) or one or more of the antenna subarrays 230 may be oriented in suboptimal directions for receiving the transmit beams 220 (e.g., the second antenna subarray 230-b and the third antenna subarray 230-c pick up the transmit beams 220 from a shallow (end-fire) angle). Switches or other elements (e.g., multiplexing elements) within the UE 215 may connect and change the connection of one or more TXRUs of the UE 215 to one or more antenna subarrays 230, for example to switch one or more TXRUs from connecting to antenna subarrays 230 that are blocked or have poor signal reception to connecting to antenna subarrays 230 that have improved or the best signal reception. In some examples, the UE 215 may have a plurality of TXRUs (e.g., all or portions of RF chains). In some examples, the UE's number of antenna subarrays 230 may be greater than the UE's number of TXRUs.

In some examples, the network access device 205 may transmit a beam training sequence to the UE 215. The beam training sequence may include, for example, serial or parallel transmissions on a plurality of transmit beams 220. The UE 215 may perform measurements on the transmit beams 220 (e.g., RSRP measurements, RSSI measurements, RSRQ measurements, etc.) and report beam indices of the N best beams to the network access device 205. These measurements are sufficient for the network access device 205 to communicate with the UE 215 using rank-1 transmissions without diversity. However, when the UE 215 has more than one TXRU, communications using higher rank or multiplexed MIMO transmissions may be possible. Additionally or alternatively, the UE 215 may combine multiple transmit beams 220 or antenna subarray outputs in the analog or digital domains to provide diversity and improve link margin.

Prior to communicating with the UE 215 using MIMO transmissions, the network access device 205 may select one or more subsets of the N best transmit beams identified by the UE 215, and test communication with the UE 215 using the selected subset(s) of the N best transmit beams. In some examples, the subset(s) may be tested by scheduling a channel state information reference signal (CSI-RS) transmission on a downlink or a sounding reference signal (SRS) transmission on an uplink. In the CSI-RS case, the UE 215 may report to the network access device 205 which subset of transmit beams achieves the highest data rate or is best suited to achieve an objective. In the SRS case, the UE 215 may transmit on the beams selected by the network access device 205, and the network access device 205 may determine from the received transmissions which subset of transmit beams provides the highest achievable throughput or is best suited to achieve an objective.

For a subset of transmit beams to be suited for MIMO transmission with multiplexing gain, the transmit beams must be connectable to different TXRUs of the UE 215. On a downlink, a beam b is considered connected to a TXRU of the UE 215 when an antenna subarray 230 of the UE 215 receives a radio wave generated by the network access device 205 using a beam pattern b, and the antenna subarray 230 is capable of applying an appropriate directivity pattern (b') matched to b, and the output signal of the antenna subarray 230 may be routed via one or more switches (or other signal routing elements) to a TXRU of the UE 215. On an uplink, a beam b is considered connected to a TXRU of the UE 215 when an input signal may be routed from a TXRU of the UE 215 to an antenna subarray 230 of the UE 215 via one or more switches (or other signal routing elements), and the antenna subarray 230 is capable of applying, to the input signal, the appropriate directivity pattern (b') matched to the beam pattern b, to transmit a radio wave to the network access device 205. The network access device 205 may use beam pattern b for its antenna subarray to receive the radio wave transmitted by the UE 215. When a subset of transmit beams is connectable to different TXRUs of the UE 215, the subset of transmit beams may be considered MIMO-compatible.

For a subset of transmit beams to be suited for MIMO transmission with diversity gain, the transmit beams must be 1) connectable to different TXRUs of the UE 215, or 2) combinable in the analog domain and connectable to a TXRU of the UE 215. On a downlink, beams $b_1$ and $b_2$ are considered combined in the analog domain and connected to a TXRU of the UE 215 when the UE 215 receives radio waves on beams $b_1$ and $b_2$, generated by the network access device 205, at a single antenna subarray 230 (or at different antenna subarrays 230 having outputs that may be added) using an appropriate directivity pattern (b') matched to the sum of beam patterns $b_1$ and $b_2$, and the output signal of the single antenna subarray 230 (or sum of outputs of the different antenna subarrays 230) may be routed via one or more switches (or other elements) to the TXRU of the UE 215. On an uplink, beams $b_1$ and $b_2$ are considered combined in the analog domain and connected to a TXRU of the UE 215 when an input signal may be routed from a TXRU of the UE 215 to a single antenna subarray 230 of the UE 215 (or to different antenna subarrays 230) via one or more switches (or other routing elements), and the single antenna subarray 230 (or combination of different antenna subarrays 230) is capable of applying, to the input signal, the appropriate directivity pattern (b') matched to the sum of beam patterns $b_1$ and $b_2$, to transmit radio waves to the network access device 205. The network access device 205 may use the sum of beam patterns $b_1$ and $b_2$ to receive the transmitted radio waves. When a subset of transmit beams meets one of these conditions, the subset of transmit beams may be considered MIMO-compatible.

An antenna subarray 230 of the UE 215 may be connected to (or disconnected from) a TXRU of the UE 215 by one or more switches (e.g., electronic switches) or other elements within the UE 215. The switches may be controlled by a modem of the UE 215, and in some cases may simultaneously connect two or more antenna subarrays 230 of the UE 215 to two or more respective TXRUs of the UE 215. However, when the number of antenna subarrays 230 of the UE 215 exceeds the number of TXRUs of the UE 215, each antenna subarray 230 to TXRU routing configuration of the UE 215 will result in one or more antenna subarray(s) 230 being disconnected from the UE's TXRU(s). Transmit beams that can only be received by a disconnected antenna subarray 230 of a routing configuration cannot be processed while the UE 215 is operated in the routing configuration where the antenna subarray 230 is disconnected. For purposes of this disclosure, a routing configuration of a UE is defined to be a configuration of switches or other elements of the UE that connects a number of antenna subarrays of the UE to a number of TXRUs of the UE (and via the TXRU(s), to a modem). The antenna subarray(s) may be connected to the TXRU(s) by one or more RF up-converters, RF down-converters, analog-to-digital converters (ADCs), digital-to-analog converters (DACs), etc. A UE may be configured in one routing configuration at a time. The UE's architecture, the MIMO transmission mode (e.g., a MIMO multiplexing mode or MIMO diversity mode), and/or measurements performed for the received beams may determine the UE's possible routing configurations, and which antenna subarrays 230 are disconnected.

When a routing configuration of the UE 215 results in one or more antenna subarrays 230 being disconnected from the UE's TXRU(s), and one of the N best transmit beams is only receivable by the disconnected antenna subarray 230, there exists a possibility that not all subsets of the N best transmit beams are MIMO-compatible. When the network access device 205 tests communications with the UE 215 using a subset of transmit beams that is not MIMO-compatible (e.g., by scheduling a CSI-RS or SRS transmission using the subset of transmit beams), no multiplexing or diversity gain is achieved, and the time spent testing the subset of transmit beams may be useless or wasteful.

Figure 3:
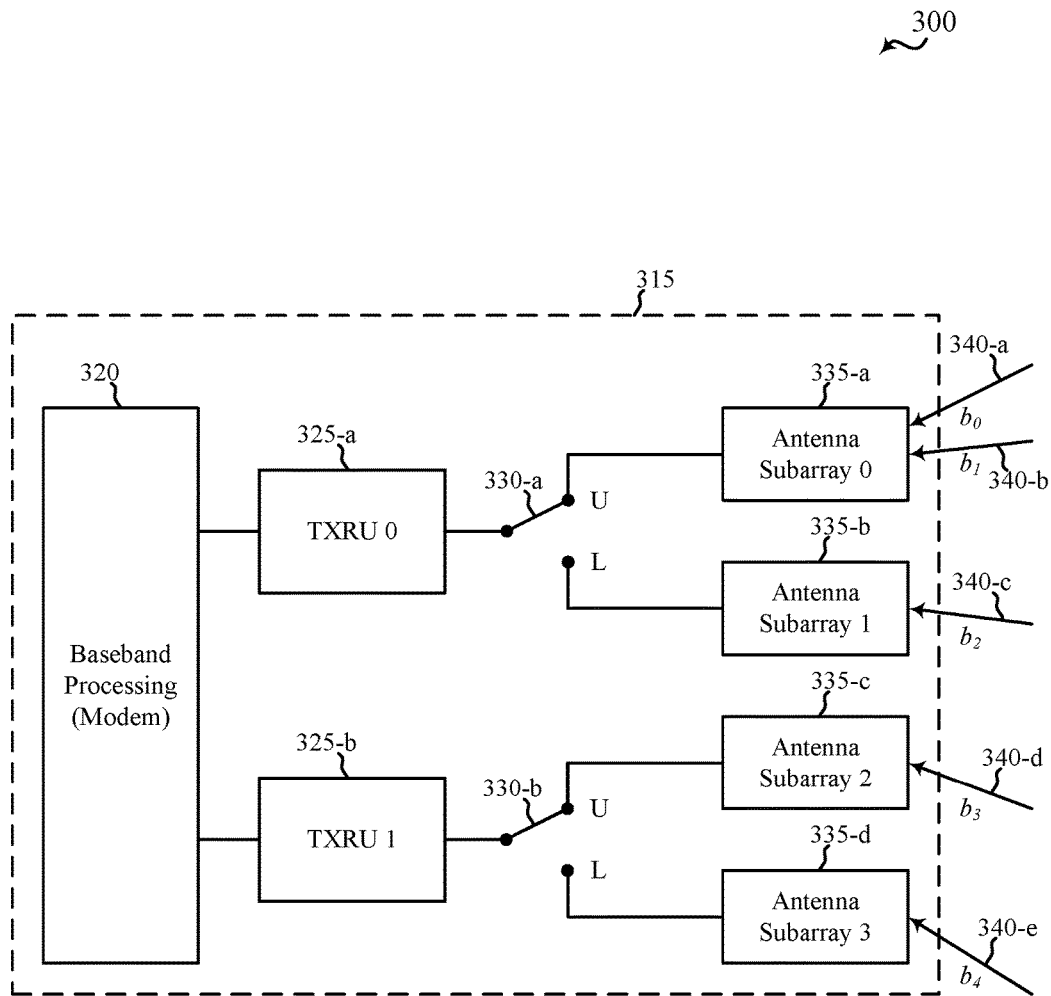
FIG. 3 shows an example architecture of a UE, in accordance with aspects of the present disclosure.

FIG. 3 shows an example architecture 300 of a UE 315, in accordance with aspects of the present disclosure. The UE 315 may be an example of aspects of the UEs 115 or 215 as described with reference to FIGS. 1 and 2. The UE 315 may include a baseband processing system (e.g., a modem 320), a number of TXRUs 325 (e.g., a first TXRU 325-a and a second TXRU 325-b), a number of switches 330 (e.g., a first switch 330-a and a second switch 330-b), and a number of antenna subarrays 335 (e.g., a first antenna subarray 335-a, a second antenna subarray 335-b, a third antenna subarray 335-c, and a fourth antenna subarray 335-d).

In some examples, a network access device may transmit a beam training sequence to the UE 315. The beam training sequence may include, for example, serial or parallel transmissions on a plurality of transmit beams 340 (e.g., transmit beams $b_0$, $b_1$, $b_2$, $b_3$, and $b_4$). By way of example, each of transmit beams $b_0$ and $b_1$ may be connected to the first TXRU 325-a when the first switch 330-a is in an upper (U) position, transmit beam $b_2$ may be connected to the first TXRU 325-a when the first switch 330-a is in a lower (L) position, transmit beam $b_3$ may be connected to the second TXRU 325-b when the second switch 330-b is in a U position, and transmit beam $b_4$ may be connected to the second TXRU 325-b when the second switch 330-b is in a L position. Due to the architecture 300 of the UE 315, the transmit beams $b_0$ and $b_2$ cannot be connected to different TXRUs 325 and cannot be combined in the analog domain. Transmit beams $b_0$ and $b_2$ are therefore not MIMO-compatible for the architecture 300. Transmit beam pairs $\{b_1, b_2\}$, and $\{b_3, b_4\}$ are also not MIMO-compatible, for similar reasons. The transmit beams of the transmit beam pairs {$b_0$, $b_3$}, {$b_0$, $b_4$}, {$b_1$, $b_3$}, {$b_1$, $b_4$}, {$b_2$, $b_3$}, and {$b_2$, $b_4$} can be connected to different TXRUs 325, and are thus MIMO-compatible for multiplexing gain or diversity gain. Additionally, the transmit beams of the transmit beam pair {$b_0$, $b_1$} can be combined in the analog domain and are therefore MIMO-compatible for diversity gain.

By transmitting (reporting) to the network access device an indication of MIMO-compatible transmit beams (i.e., an indication of at least one set of multiple transmit beams that is usable by at least one routing configuration of the UE), the UE 315 may enable the network access device to avoid testing communications with the UE 315 (e.g., avoid scheduling CSI-RS or SRS transmissions to or from the UE 315, respectively) on subsets of transmit beams that are not MIMO-compatible for the UE 315. For purposes of this disclosure, a set of multiple transmit beams that is usable by at least one routing configuration of the UE 315 may include a set of multiple transmit beams that increases multiplexing gain and/or increases diversity gain. In some examples, the indication of MIMO-compatible transmit beams may be transmitted to the network access device on a channel associated with a lower frequency than the plurality of transmit beams (e.g., on a sub-6 GigaHertz (GHz) NR, LTE, 3G, or 2G channel instead of a mmW channel). In some cases, this channel may be a control channel. When one or more connections between an antenna subarray 335 and a TXRU 325 do not allow for bidirectional (transmit (Tx) and receive (Rx)) communication, the UE 315 may transmit a first indication of MIMO-compatible transmit beams on a downlink, and a second indication of MIMO-compatible transmit beams on an uplink.

In some examples, the indication of MIMO-compatible transmit beams transmitted to the network access device may include a first indication of one or more sets of multiple transmit beams that can be connected to different TXRUs 325 of the UE 315 (if any), and a second indication of one or more sets of multiple transmit beams that can be combined in the analog domain (e.g., in the RF or intermediate frequency (IF) domain) and connected to a TXRU 325 of the UE 315. The first indication may be referred to in this disclosure as $S_{DIFF\text{-}TXRU}$, and the second indication may be referred to as $S_{COMB}$.

In some examples, the UE 315 may transmit explicit indications of the beam tuples included in $S_{DIFF\text{-}TXRU}$ and $S_{COMB}$ to a network access device. In this example, each beam tuple includes a pair of beams (e.g., transmit beams), but each beam tuple may include three or more beams, or may have varying numbers of beams per tuple. For example, the UE 315 may transmit the indications:

$S_{DIFF\text{-}TXRU}$={{$b_0$, $b_3$}, {$b_0$, $b_4$}, {$b_1$, $b_3$}, {$b_1$, $b_4$}, {$b_2$, $b_3$}, {$b_2$, $b_4$}}

$S_{COMB}$={{$b_0$, $b_1$}}

For a UE that has more than two TXRUs 325, the UE may also indicate higher order beam tuples. For example, a UE capable of simultaneously receiving or transmitting beams connected to L TXRUs, with 2≤L≤M, may report sets of 2 beams, sets of 3 beams, etc. as part of $S_{DIFF\text{-}TXRU}$. Similarly, a UE capable of simultaneously receiving or transmitting more than 2 beams via a single antenna subarray may report sets of 2 beams, sets of 3 beams, etc. as part of $S_{COMB}$.

In some examples, the UE 315 may perform pre-processing on the beam tuples that may be included in $S_{DIFF\text{-}TXRU}$, to exclude beam tuples that may be close in angle of arrival (AoA), that have the same polarization, or that are otherwise not well-suited to provide MIMO multiplexing gain. In some examples, the UE 315 may restrict its reporting of beam tuples to the top $N_L$ sets of L beams connected to L TXRUs.

In some examples, the UE 315 may transmit an indication of the complement of the beam tuples included in $S_{DIFF\text{-}TXRU}$ and $S_{COMB}$, instead of the beam tuples included in $S_{DIFF\text{-}TXRU}$ and $S_{COMB}$, to the network access device. The complement of the beam tuples included in $S_{DIFF\text{-}TXRU}$ and $S_{COMB}$ are the beam tuples that are unusable (for multiplexing or for diversity) by any of the routing configurations of the UE 315. For example, the UE 315 may transmit the indications (where $\overline{S}_{DIFF\text{-}TXRU}$ is the complement of the beam tuples included in $S_{DIFF\text{-}TXRU}$):

$\overline{S}_{DIFF\text{-}TXRU}$={{$b_0$, $b_1$}, {$b_0$, $b_2$}, {$b_1$, $b_2$}, {$b_3$, $b_4$}}

$S_{COMB}$={{$b_0$, $b_1$}}

With reference to the example shown in FIG. 3, $\overline{S}_{DIFF\text{-}TXRU}$ may be a smaller set than $S_{DIFF\text{-}TXRU}$, and can therefore be transmitted to the network access device in a smaller payload.

In some examples, the UE 315 may transmit an indication of each transmit beam received by the UE 315, and for each transmit beam, a set of one or more TXRUs 325 of the UE 315 that is usable to receive the transmit beam. For example, with reference to FIG. 3, the UE 315 can transmit the following list of transmit beams and TXRUs 325:

($b_0$, TXRU 0), ($b_1$, TXRU 0), ($b_2$, TXRU 0), ($b_3$, TXRU 1), ($b_4$, TXRU 1)

From the above list, the network access device may determine that the beam tuple {$b_0$, $b_2$}, for example, is not MIMO-compatible for multiplexing gain because both transmit beams can only be connected the first TXRU 325-a (i.e., TXRU 0). The network access device may also determine from the above list that the beam tuple {$b_0$, $b_3$} is MIMO-compatible for multiplexing gain, because transmit beam $b_0$ can be connected to the first TXRU 325-a and transmit beam $b_3$ can be connected to the second TXRU 325-b (i.e., TXRU 1). Thus, the network access device may derive the set of beam tuples included in $S_{DIFF\text{-}TXRU}$ from the above list. However, the network access device may not derive the set of beam tuples included in $S_{COMB}$ from the above list. For instance, the network access device can determine that the transmit beams $b_0$, $b_1$, and $b_2$ can be connected to TXRU 0, but it cannot determine which transmit beams can be simultaneously connected to TXRU 0. $S_{COMB}$ can therefore be indicated to the network access device as previously described, or as described below.

In some examples, the UE 315 may transmit an indication of each transmit beam received by the UE 315, and for each transmit beam, a set of one or more TXRUs 325 and routing configurations of the UE 315 that is usable to receive the transmit beam. For example, with reference to FIG. 3, the UE 315 can transmit the following list of transmit beams, TXRUs 325, and routing configurations:

($b_0$, TXRU 0, {UU, UL}), ($b_1$, TXRU 0, {UU, UL}), ($b_2$, TXRU 0, {LU, LL}), ($b_3$, TXRU 1, {UU, LU}), ($b_4$, TXRU 1, {UL, LL})

where UU identifies a routing configuration in which the first switch 330-a is in its upper position and the second switch 330-b is in its upper position, UL identifies a routing configuration in which the first switch 330-a is in its upper position and the second switch 330-b is in its lower position, LU identifies a routing configuration in which the first switch 330-a is in its lower position and the second switch 330-b is in its upper position, and LL identifies a routing configuration in which the first switch 330-a is in its lower position and the second switch 330-b is in its lower position. From the above list, the network access device may determine that there is no routing configuration that allows transmit beams $b_0$ and $b_2$ to be connected to TXRU 0 simultaneously. The network access device may also determine from the above list that transmit beams $b_0$ and $b_1$ can be connected to TXRU 0, simultaneously, using the routing configuration UU or UL. The network access device may further determine from the above list that transmit beams $b_1$ and $b_3$ can be respectively connected to TXRU 0 and TXRU 1, simultaneously, using the routing configuration UU. Thus, the network access device may derive the set of beam tuples included in $S_{DIFF-TXRU}$ and $S_{COMB}$ from the above list.

Figure 4:
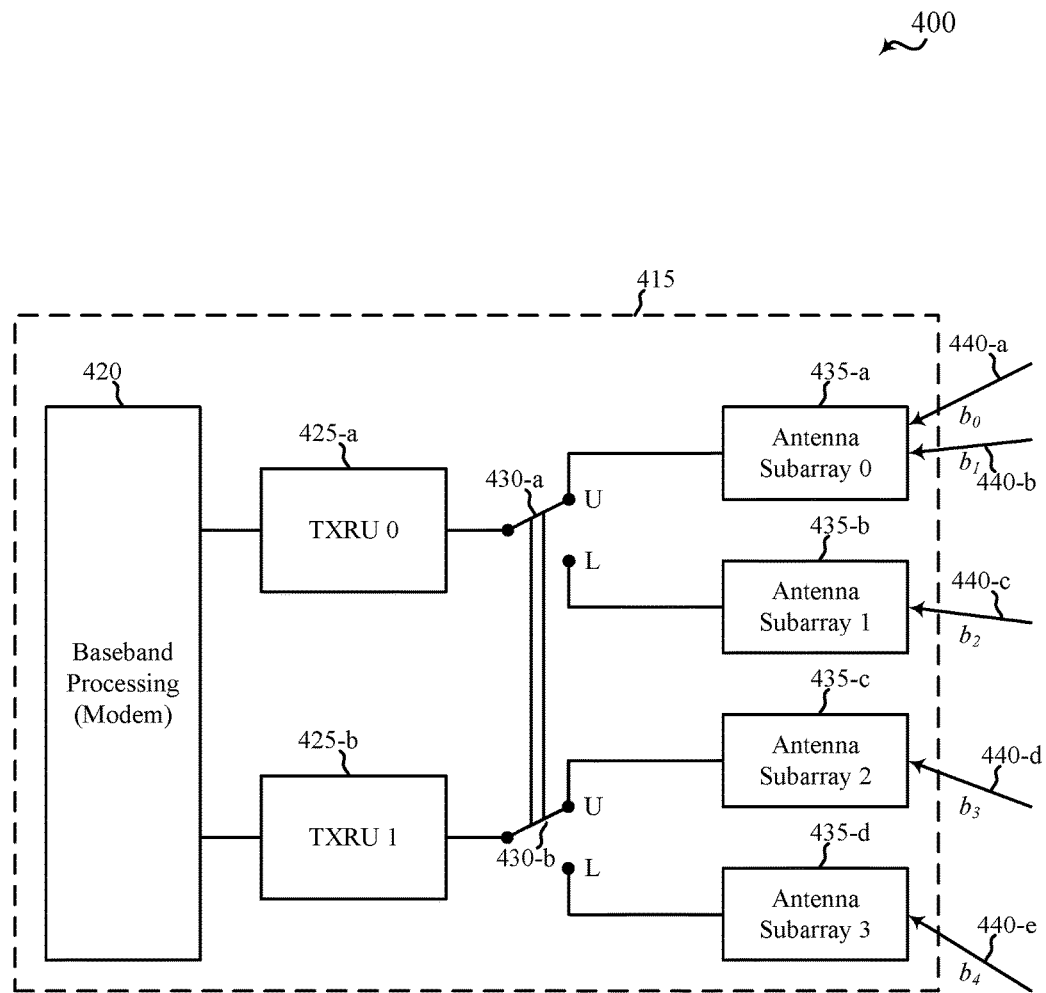
FIG. 4 shows an example architecture of a UE, in accordance with aspects of the present disclosure.

FIG. 4 shows an example architecture 400 of a UE 415, in accordance with aspects of the present disclosure. The UE 415 may be an example of aspects of the UEs 115 or 215 as described with reference to FIGS. 1 and 2. The UE 415 may include a baseband processing system (e.g., a modem 420), a number of TXRUs 425 (e.g., a first TXRU 425-*a* and a second TXRU 425-*b*), a number of switches 430 (e.g., a first switch 430-*a* and a second switch 430-*b*), and a number of antenna subarrays 435 (e.g., a first antenna subarray 435-*a*, a second antenna subarray 435-*b*, a third antenna subarray 435-*c*, and a fourth antenna subarray 435-*d*).

FIG. 4 assumes that the antenna subarrays 435 of the UE 415 are positioned and oriented similarly to the antenna subarrays 335 of the UE 315, and that the UE 415 receives the same beam training sequence (including transmit beams $b_0$, $b_1$, $b_2$, $b_3$, and $b_4$) from the same network access device as, in a similar manner to, the UE 315 as described with reference to FIG. 3. However, in contrast to the UE 315, the first switch 430-*a* and the second switch 430-*b* are switched (moved) simultaneously, between a UU routing configuration and a LL routing configuration. For example, the first switch 430-*a* and the second switch 430-*b* may be ganged, such that the architecture 400 of the UE 415 does not support a UL or a LU routing configuration. As a result, transmit beams b2 and b3 are not MIMO-compatible, even though the two transmit beams can be separately connected to different TXRUs.

Due to the simultaneous switching of the first switch 430-*a* and the second switch 430-*b*, the UE 415 may not indicate $S_{DIFF-TXRU}$ to the network access device by transmitting an indication of each transmit beam received by the UE 415, and for each transmit beam, a set of one or more TXRUs 425 of the UE 415 that is usable to receive the transmit beam. However, the UE 415 may indicate $S_{DIFF-TXRU}$ to the network access device by transmitting an indication of each transmit beam received by the UE 415, and for each transmit beam, a set of one or more TXRUs 425 and routing configurations of the UE 415 that is usable to receive the transmit beam. For example, the UE 415 can transmit the following list of transmit beams, TXRUs 425, and routing configurations:

($b_0$, TXRU 0, U), ($b_1$, TXRU 0, U), ($b_2$, TXRU 0, L), ($b_3$, TXRU 1, U), ($b_4$, TXRU 1, L)

where U identifies a routing configuration in which the first switch 430-*a* and the second switch 430-*b* are in their upper positions, and L identifies a routing configuration in which the first switch 430-*a* and the second switch 430-*b* are in their lower positions.

In some cases, an indication of MIMO-compatible beams (e.g., $S_{DIFF-TXRU}$ or $S_{COMB}$) may be used to streamline a beam refinement procedure. A beam refinement procedure may be performed as part of a beam training procedure, and may include a receive beam refinement procedure, a transmit beam refinement procedure, or a transmit/receive beam refinement procedure.

Figure 5:
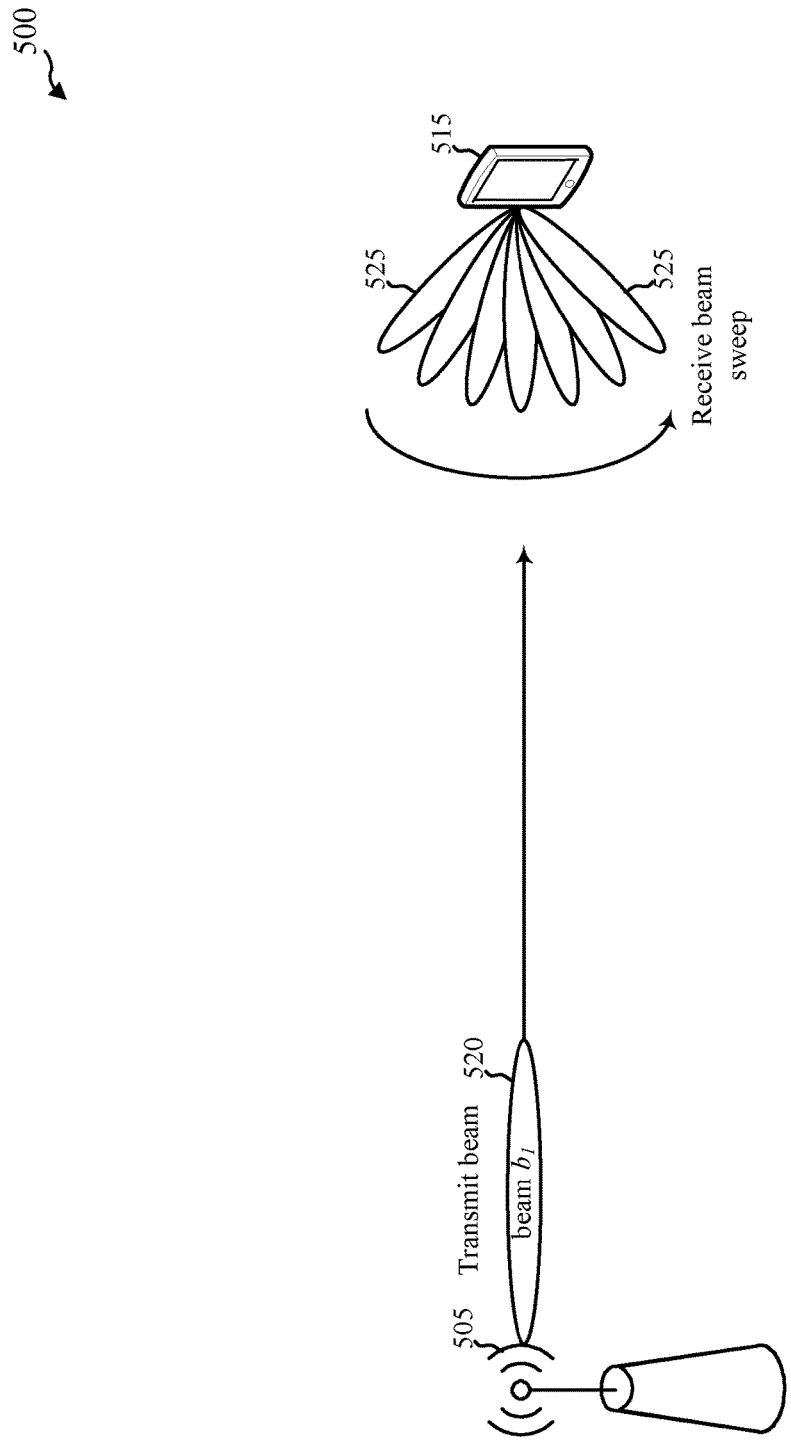
FIG. 5 shows an example of a wireless communications system in which a receive beam refinement procedure is performed, in accordance with aspects of the present disclosure.

FIG. 5 shows an example of a wireless communications system 500 in which a receive beam refinement procedure is performed, in accordance with aspects of the present disclosure. The wireless communications system 500 may include a network access device 505 (e.g., a gNB, ANC, and/or RH) and a UE 515. The wireless communications system 500, network access device 505, and UE 515 may be examples of aspects of the wireless communications system, network access devices, and UEs as described with reference to FIGS. 1-4. In some examples, the network access device 505 may be a MWB.

The network access device 505 may transmit to the UE 515 on a transmit beam 520 (e.g., transmit beam $b_1$). The transmit beam 520 may be transmitted from one of a number of antenna subarrays of the network access device 505 and received by one of a number of antenna subarrays of the UE 515 on a receive beam 525. The UE 515 may perform a receive beam sweep for the antenna subarray that detects the transmit beam 520, and may identify a receive beam 525 associated with a highest receive power for the transmit beam 520. The UE 515 may indicate the receive beam 525 associated with the highest receive power for the transmit beam 520 to the network access device 505.

In some cases, a UE may identify a receive beam associated with a highest receive power for each of a plurality of beams transmitted by a network access device. In some examples, the receive beams for different transmit beams may be identified serially, in response to serial transmissions of the different transmit beams. However, when a UE is able to indicate MIMO-compatible transmit beams usable for diversity gain to a network access device, the network access device may perform a beam refinement procedure for a set of MIMO-compatible transmit beams transmitted in parallel.

Figure 6:
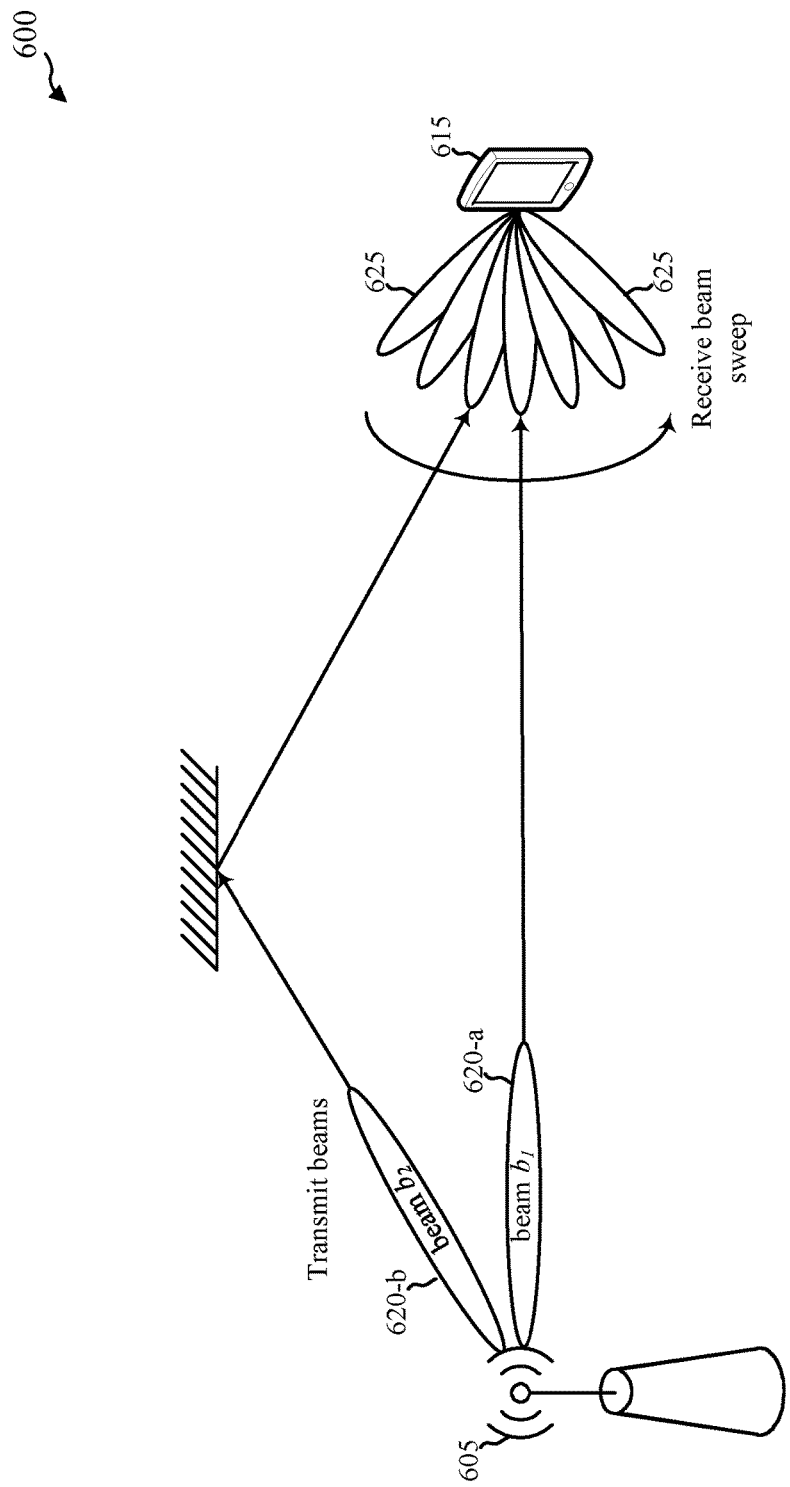
FIG. 6 shows an example of a wireless communications system in which a receive beam refinement procedure is performed, in accordance with aspects of the present disclosure.

FIG. 6 shows an example of a wireless communications system 600 in which a receive beam refinement procedure is performed, in accordance with aspects of the present disclosure. The wireless communications system 600 may include a network access device 605 (e.g., a gNB, ANC, and/or RH) and a UE 615. The wireless communications system 600, network access device 605, and UE 615 may be examples of aspects of the wireless communications system, network access devices, and UEs as described with reference to FIGS. 1-5. In some examples, the network access device 605 may be a MWB.

The network access device 605 may transmit to the UE 615 on a plurality of transmit beams 620 (e.g., a first transmit beam 620-*a* (transmit beam $b_1$) and a second transmit beam 620-*b* (transmit beam $b_2$)). The transmit beams 620 may be transmitted from a plurality of antenna subarrays of the network access device 605 and received by one of a number of antenna subarrays of the UE 615. The transmit beams 620 may be received at the UE 615 on a plurality of receive beams 625. When the UE 615 is able to indicate one or more sets of MIMO-compatible transmit beams to the network access device 605, before the transmit beams 620 are transmitted, the network access device 605 may select a set of the MIMO-compatible transmit beams for performing a receive beam refinement procedure with the UE 615. The receive beam refinement procedure may include simultaneously transmitting the selected set of MIMO-compatible transmit beams, on orthogonal resources, from the network access device 605 to the UE 615. At the UE-side, the receive beam refinement procedure may include performing a receive beam sweep (e.g., for the antenna subarray that detects the transmit beams 620). The receive beam refinement procedure may also include identifying, at the UE 615, one or more receive beams 625 associated with a highest receive power for the first transmit beam 620-a and a highest receive power for the second transmit beam 620-b. The UE 615 may indicate the receive beam(s) 625 associated with the highest receive power(s) for the transmit beams 620 to the network access device 605. Of note, the receive beam refinement procedure may be performed for multiple transmit beams with a single receive beam sweep by the UE 615, thus saving time and airlink resources over serially performing receive beam refinement procedures for the transmit beams.

A network access device may also perform a beam refinement procedure for multiple transmit beams, transmitted in parallel, when a UE is able to indicate MIMO-compatible transmit beams usable for diversity and multiplexing gain to the network access device.

Figure 7:
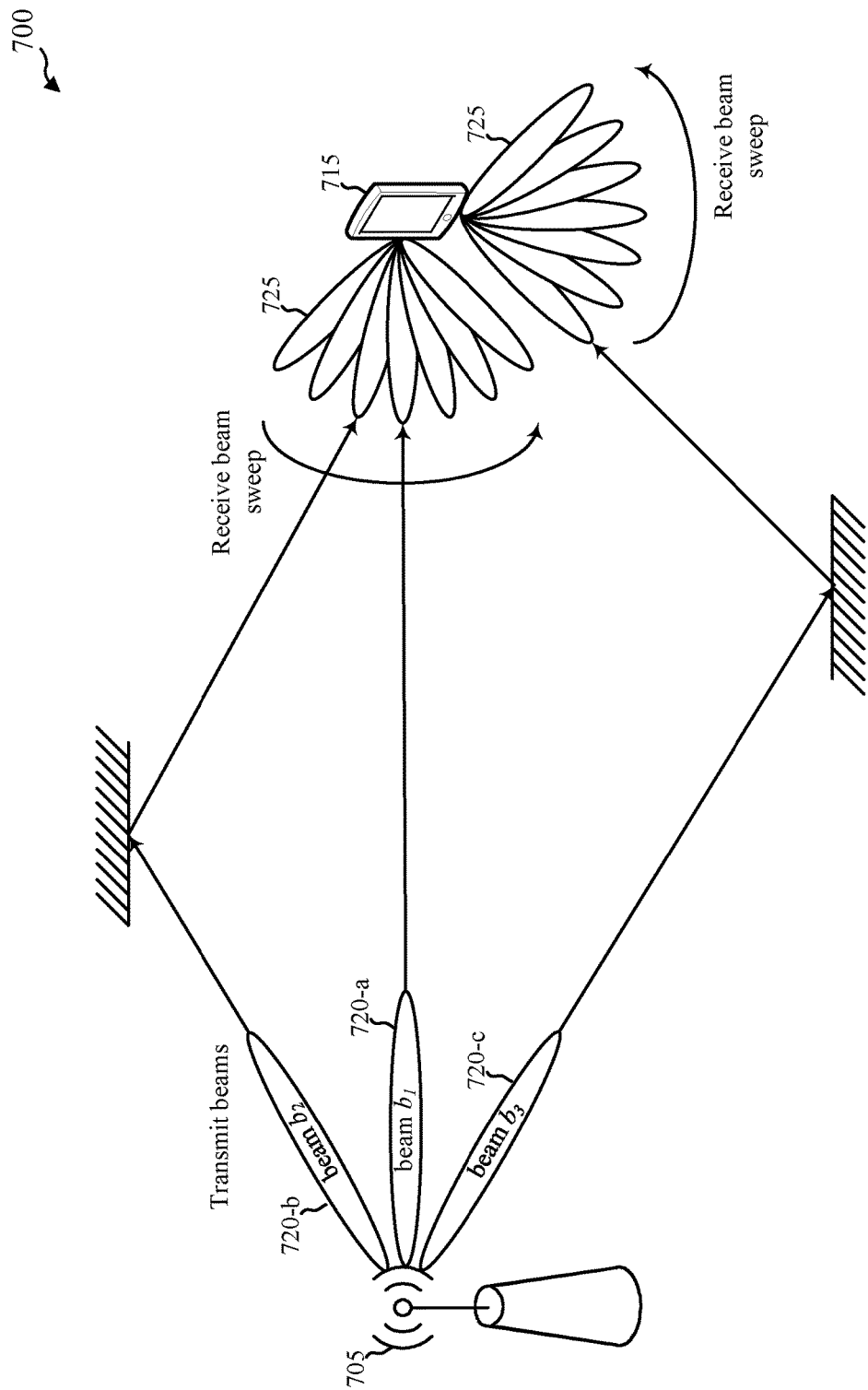
FIG. 7 shows an example of a wireless communications system in which a receive beam refinement procedure is performed, in accordance with aspects of the present disclosure.

FIG. 7 shows an example of a wireless communications system 700 in which a receive beam refinement procedure is performed, in accordance with aspects of the present disclosure. The wireless communications system 700 may include a network access device 705 (e.g., a gNB, ANC, and/or RH) and a UE 715. The wireless communications system 700, network access device 705, and UE 715 may be examples of aspects of the wireless communications system, network access devices, and UEs as described with reference to FIGS. 1-6. In some examples, the network access device 705 may be a MWB.

The network access device 705 may transmit to the UE 715 on a plurality of transmit beams 720 (e.g., a first transmit beam 720-a (transmit beam $b_1$), a second transmit beam 720-b (transmit beam $b_2$), and a third transmit beam 720-c (transmit beam $b_3$)). The transmit beams 720 may be transmitted from a plurality of antenna subarrays of the network access device 705 and received by a plurality of antenna subarrays of the UE 715. The transmit beams 720 may be received at the UE 715 on a plurality of receive beams 725. When the UE 715 is able to indicate one or more sets of MIMO-compatible transmit beams to the network access device 705, before the transmit beams 720 are transmitted, the network access device 705 may select a set of the MIMO-compatible transmit beams for performing a receive beam refinement procedure with the UE 715. The receive beam refinement procedure may include simultaneously transmitting the selected set of MIMO-compatible transmit beams, on orthogonal time-frequency resources, from the network access device 705 to the UE 715. At the UE-side, the receive beam refinement procedure may include performing (simultaneously) receive beam sweeps for each antenna subarray of the UE 715 that detects one or more of the transmit beams 720 and is connected to a different TXRU of the UE 715. The receive beam refinement procedure may also include identifying, at the UE 715, one or more receive beams 725 associated with a highest receive power for the first transmit beam 720-a, a highest receive power for the second transmit beam 720-b, and a highest receive power for the third transmit beam 720-c. The UE 715 may indicate the receive beam(s) 725 associated with the highest receive power(s) for the transmit beams 720 to the network access device 705.

Figure 8:
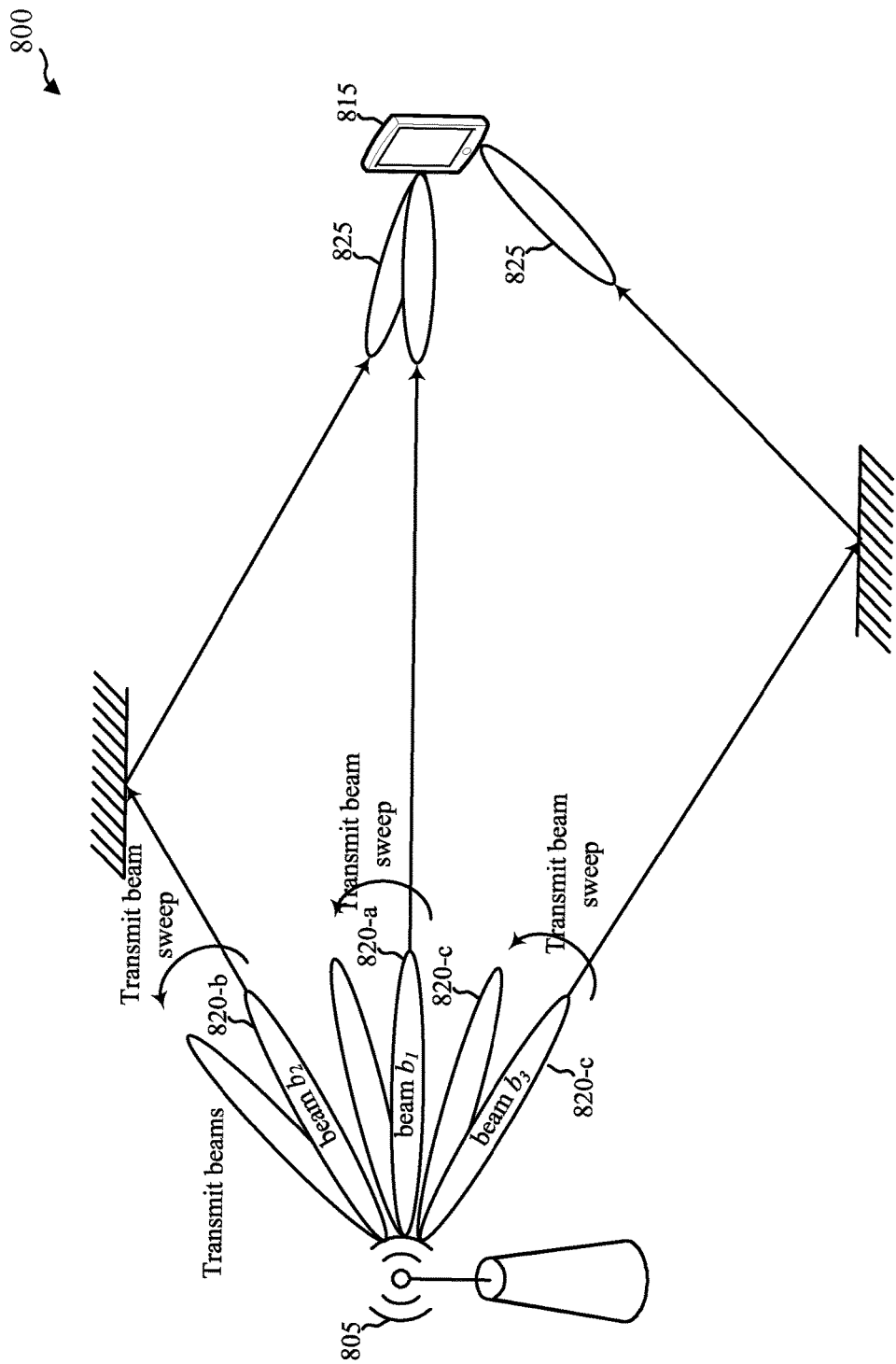
FIG. 8 shows an example of a wireless communications system in which a transmit beam refinement procedure is performed, in accordance with aspects of the present disclosure.

FIG. 8 shows an example of a wireless communications system 800 in which a transmit beam refinement procedure is performed, in accordance with aspects of the present disclosure. The wireless communications system 800 may include a network access device 805 (e.g., a gNB, ANC, and/or RH) and a UE 815. The wireless communications system 800, network access device 805, and UE 815 may be examples of aspects of the wireless communications system, network access devices, and UEs as described with reference to FIGS. 1-7. In some examples, the network access device 805 may be a MWB.

When the UE 815 is able to indicate one or more sets of MIMO-compatible transmit beams to the network access device 805, the network access device 805 may select a set of the MIMO-compatible transmit beams (e.g., a first transmit beam 820-a (transmit beam $b_1$), a second transmit beam 820-b (transmit beam $b_2$), and a third transmit beam 820-c (transmit beam $b_3$)) for performing a transmit beam refinement procedure. The network access device 805 may schedule the UE 815 to receive the selected set of MIMO-compatible transmit beams 820 in parallel, and the UE 815 may configure its antenna subarrays to receive each of the MIMO-compatible transmit beams 820 on a set of one or more receive beams 825 (and in some cases, on a refined set of one or more receive beams 825). As shown, the transmit beams 820 may be transmitted from a number of antenna subarrays of the network access device 805 and received by a number of antenna subarrays of the UE 815. In addition to transmitting the transmit beams 820, the network access device 805 may perform a transmit beam sweep for each of the transmit beams 820, and the UE 815 may identify a transmit beam 820 associated with a highest receive power in each transmit beam sweep. The UE 815 may indicate the transmit beam(s) associated with the highest receive power(s) in each transmit beam sweep to the network access device 805.

In the context of FIGS. 6, 7, and 8, the one or more sets of MIMO-compatible transmit beams may be alternatively referred to as one or more sets of transmit beams that can be simultaneously received by the UE 615, 715, or 815 during performance of a receive beam refinement procedure or transmit beam refinement procedure.

In some examples, refinement of both receive beams and transmit beams can be achieved by executing a transmit beam refinement procedure sequentially for various candidate receive beams, or by sequentially executing a receive beam refinement procedure for various candidate transmit beams. In either case, a network access device may identify a set of multiple beams for performing the beam refinement procedures based on an indication of MIMO-compatible beams received from a UE.

Figure 9:
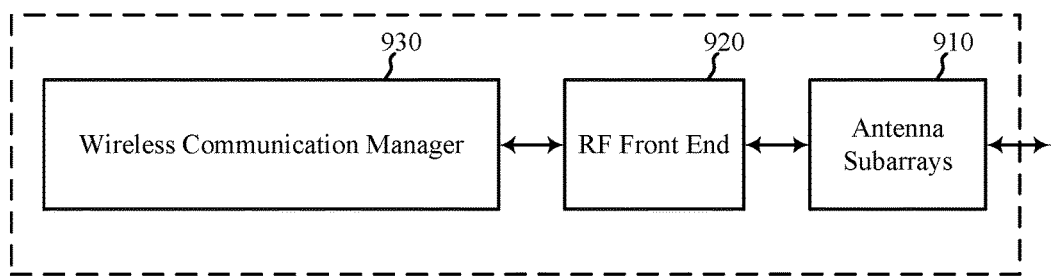
FIG. 9 shows a block diagram of an apparatus that supports wireless communication at a UE or network access device, in accordance with aspects of the present disclosure.

FIG. 9 shows a block diagram of an apparatus 900 that supports wireless communication at a UE or network access device, in accordance with aspects of the present disclosure. The apparatus 900 may be an example of aspects of the UEs or network access devices as described with reference to FIGS. 1-8. The apparatus 900 may include antenna subarrays 910, an RF front end 920, and a wireless communication manager 930. The apparatus 900 may also include a processor. Each of these components may be in communication with each other.

The antenna subarrays 910 may include antenna subarrays for receiving or transmitting signals (e.g., synchronization signals or reference signals) or information (e.g., control information or user data) associated with various channels (e.g., control channels, data channels, broadcast channels, multicast channels, unicast channels, etc.). The antenna subarrays may be capable of receiving one or more beams over a RF spectrum. Received signals and information may be used by the RF front end 920 (e.g., for frequency/time tracking) or passed to other components of the apparatus 900, including the wireless communication manager 930. The antenna subarrays 910 may be an example of aspects of the antenna subarrays as described with reference to FIGS. 2-8, 12, and 15. The RF front end 920 may be an example of aspects of the RF front ends, switches (or other elements), and TXRUs as described with reference to FIGS. 2-8, 12, and 15.

The wireless communication manager 930 may be used to manage one or more aspects of wireless communication for the apparatus 900, and in some cases may include a modem, such as a modem having aspects of the modems as described with reference to FIGS. 3 and 4. In some examples, the wireless communication manager 930 may be an example of aspects of the wireless communication manager as described with reference to FIG. 1, 12, or 15. When the apparatus 900 is included in a UE, the wireless communication manager 930 may be used to identify one or more sets of multiple beams that are compatible with at least one configuration for routing signals between the antenna subarrays 910 and the RF front end 920 (e.g., TXRUs of the RF front end 920), and to transmit an indication of the identified one or more sets of multiple beams to a network access device. When the apparatus 900 is included in a network access device, the wireless communication manager 930 may be used to receive, from a UE, an indication of one or more sets of multiple beams that are compatible with at least one configuration for routing signals between antenna subarrays and TXRUs of the UE, and to select a set of multiple beams from the one or more sets of multiple beams to use to communicate with the UE.

Figure 10:
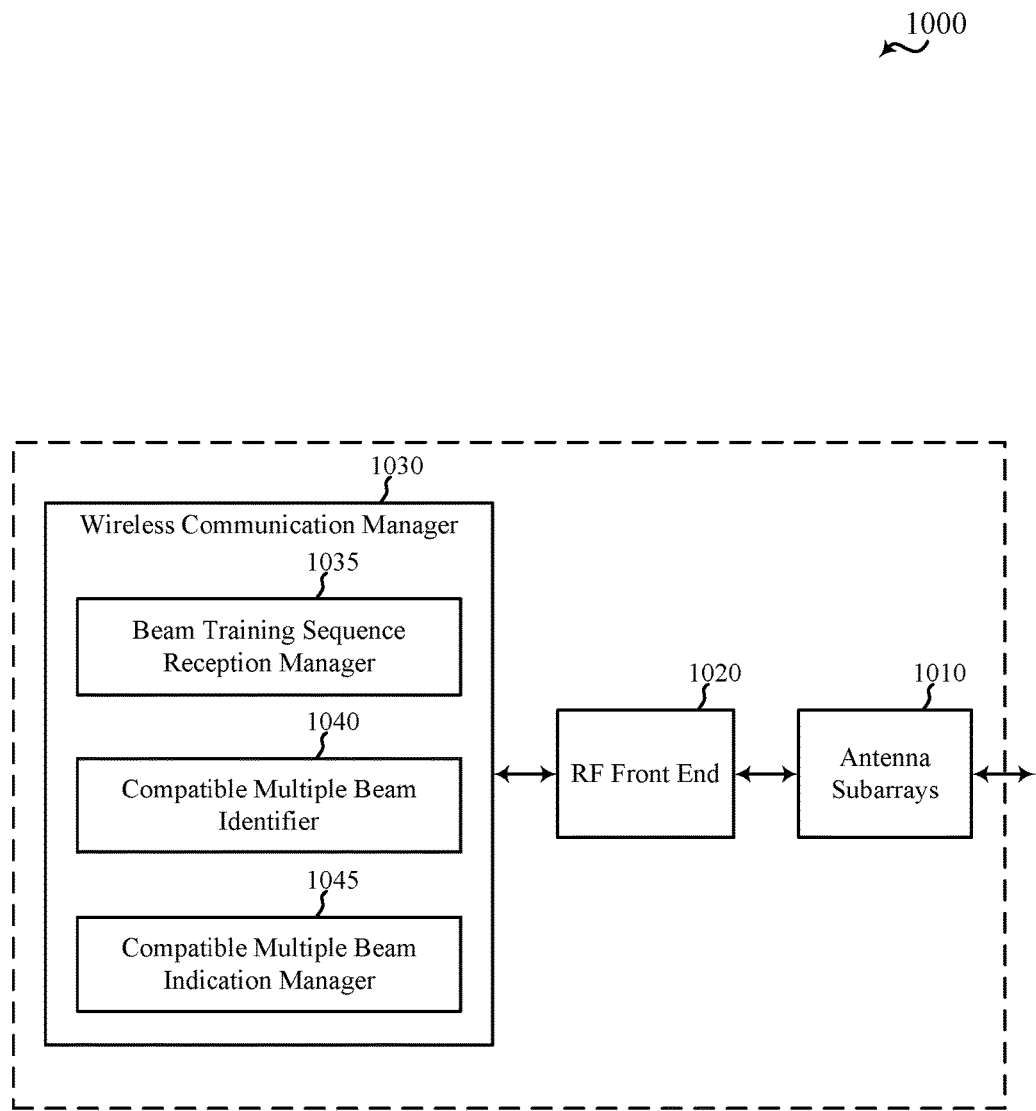
FIG. 10 shows a block diagram of an apparatus that supports wireless communication at a UE, in accordance with aspects of the present disclosure.

FIG. 10 shows a block diagram of an apparatus 1000 that supports wireless communication at a UE, in accordance with aspects of the present disclosure. The apparatus 1000 may be an example of aspects of the UEs or apparatus as described with reference to FIGS. 1-9. The apparatus 1000 may include antenna subarrays 1010, an RF front end 1020, and a wireless communication manager 1030. The apparatus 1000 may also include a processor. Each of these components may be in communication with each other.

The antenna subarrays 1010 may include antenna subarrays for receiving or transmitting signals (e.g., synchronization signals or reference signals) or information (e.g., control information or user data) associated with various channels (e.g., control channels, data channels, broadcast channels, multicast channels, unicast channels, etc.). The antenna subarrays 1010 may be capable of receiving or transmitting one or more beams over a RF spectrum. Received signals and information may be used by the RF front end 1020 (e.g., for frequency/time tracking) or passed to other components of the apparatus 1000, including the wireless communication manager 1030. The antenna subarrays 1010 may be an example of aspects of the antenna subarrays as described with reference to FIGS. 2-9, and 12. The RF front end 1020 may be an example of aspects of the RF front ends, switches (or other elements), and TXRUs as described with reference to FIGS. 2-9, and 12.

The wireless communication manager 1030 may be used to manage one or more aspects of wireless communication for the apparatus 1000, and in some cases may include a modem, such as a modem having aspects of the modems as described with reference to FIGS. 3 and 4. In some examples, the wireless communication manager 1030 may be an example of aspects of the wireless communication manager as described with reference to FIG. 1, 9, or 12. The wireless communication manager 1030 may include a beam training sequence reception manager 1035, a compatible multiple beam identifier 1040, and a compatible multiple beam indication manager 1045.

The beam training sequence reception manager 1035 may be used to receive a beam training sequence transmitted by a network access device on a plurality of transmit beams, as described with reference to FIGS. 3 and 4.

The compatible multiple beam identifier 1040 may be used to identify one or more sets of multiple transmit beams that are compatible with at least one configuration for routing signals between antenna subarrays 1010 of the apparatus 1000 and TXRUs of the apparatus 1000, as described with reference to FIGS. 3 and 4. The one or more sets of multiple transmit beams may be identified based at least in part on the beam training sequence received by the beam training sequence reception manager 1035. In some examples, identifying the one or more sets of multiple transmit beams may include identifying, based at least in part on the received beam training sequence, a first set of multiple transmit beams usable to provide RF communication multiplexing, a second set of multiple transmit beams usable to provide RF communication diversity, or a combination thereof. In some examples, identifying the one or more sets of multiple transmit beams may include identifying the one or more sets of multiple transmit beams based at least in part on a RF architecture of the apparatus 1000, a MIMO transmission mode, signal strengths for the plurality of transmit beams, or a combination thereof. In some examples, identifying the one or more sets of multiple transmit beams based at least in part on the RF architecture of the apparatus 1000 may include identifying the one or more sets of multiple transmit beams based at least in part on alternative configurations for routing signals between antenna subarrays 1010 of the apparatus 1000 and TXRUs of the apparatus 1000, a first capability of the apparatus 1000 to combine beams in an analog domain, a second capability of the apparatus 1000 to combine beams in a digital domain, or a combination thereof.

The compatible multiple beam indication manager 1045 may be used to transmit, to the network access device, an indication of the identified one or more sets of multiple transmit beams, as described with reference to FIGS. 3 and 4. In some examples, the indication of the identified one or more sets of multiple transmit beams may include at least a first indication of the identified one or more sets of multiple transmit beams, or a second indication of one or more sets of multiple transmit beams that are incompatible with any configuration for routing signals between antenna subarrays 1010 of the apparatus 1000 and TXRUs of the apparatus 1000, or a third indication, for each received beam of the plurality of transmit beams, of a set of one or more TXRUs of the apparatus 1000 usable to receive the transmit beam, or a fourth indication, for each received beam of the plurality of transmit beams, of a set of one or more TXRUs of the apparatus 1000 and associated routing configuration parameters of the apparatus 1000 usable to receive the transmit beam, or a combination thereof. In some examples, transmitting the indication of the identified one or more sets of multiple transmit beams may include transmitting the indication of the identified one or more sets of multiple transmit beams to the network access device on a channel associated with a lower frequency than one or more frequencies associated with the plurality of transmit beams.

Figure 11:
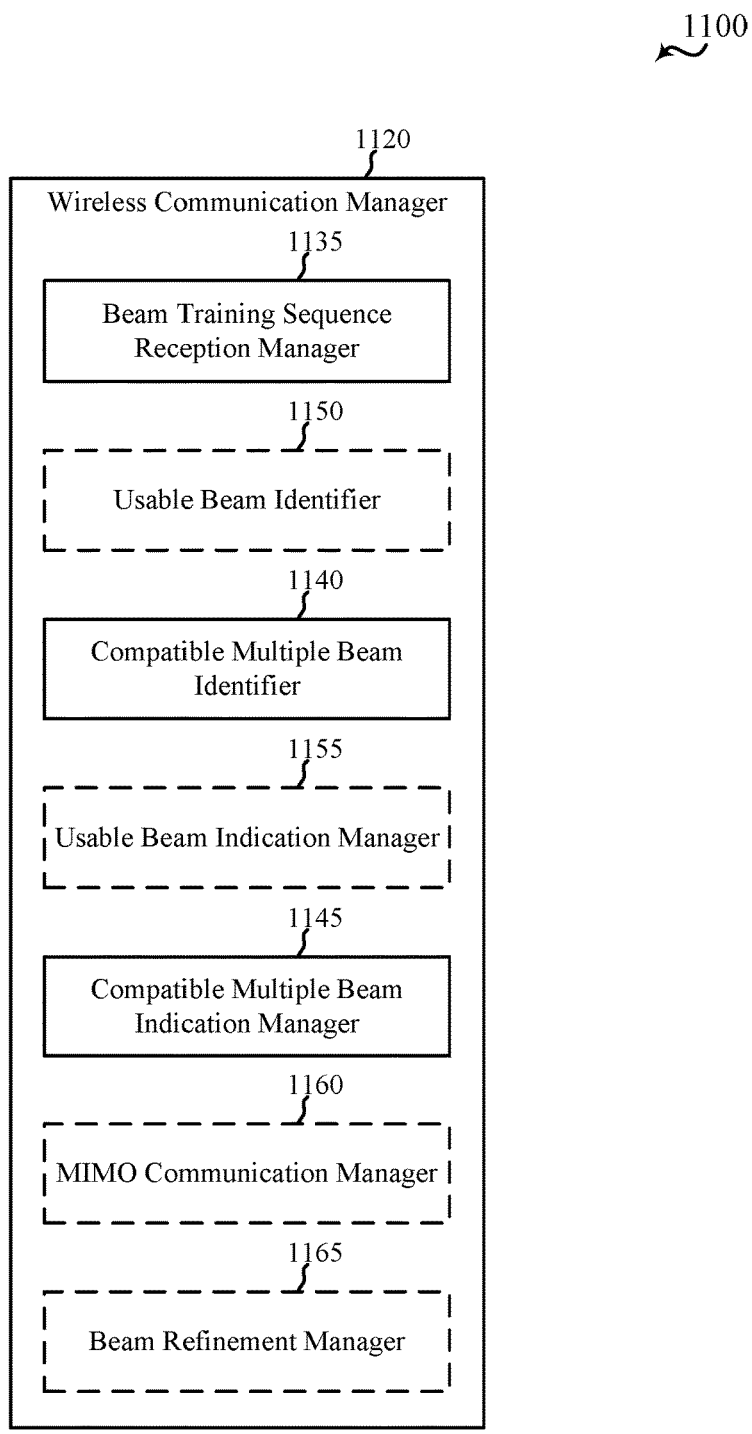
FIG. 11 shows a block diagram of a wireless communication manager, in accordance with aspects of the present disclosure.

FIG. 11 shows a block diagram of a wireless communication manager 1130, in accordance with aspects of the present disclosure. The wireless communication manager 1130 may be an example of aspects of the wireless communication managers as described with reference to FIG. 1, 9, 10, or 12, and may be included in a UE such as one of the UEs as described with reference to FIGS. 1-8 and 12.

The wireless communication manager 1130 may include a beam training sequence reception manager 1035, an optional usable beam identifier 1150, a compatible multiple beam identifier 1040, an optional usable beam indication manager 1155, a compatible multiple beam indication manager 1045, an optional MIMO communication manager 1160, and an optional beam refinement manager 1165. Each of these components may communicate, directly or indirectly, with one another (e.g., via one or more buses).

The beam training sequence reception manager 1035, compatible multiple beam identifier 1040, and compatible multiple beam indication manager 1045 may be examples of aspects of the beam training sequence reception manager 935, compatible multiple beam identifier 940, and compatible multiple beam indication manager 945 as described with reference to FIG. 9.

The usable beam identifier 1150 may be used to identify, based at least in part on the plurality of transmit beams of the beam training sequence received by the beam training sequence reception manager 1035, one or more transmit beams usable for communication between the network access device and an apparatus including the wireless communication manager 1130, as described with reference to FIG. 2.

The usable beam indication manager 1155 may be used to transmit, to the network access device, an indication of the identified set of one or more transmit beams usable for communication between the network access device and an apparatus including the wireless communication manager 1130, as described with reference to FIG. 2.

The MIMO communication manager 1160 may be used to communicate with the network access device using a MIMO transmission based at least in part on a set of multiple transmit beams identified by the indication of the one or more sets of multiple transmit beams, as described with reference to FIGS. 3 and 4.

The beam refinement manager 1165 may be used to transmit, to the network access device, a request to perform a beam refinement procedure, as described with reference to FIGS. 6-8. The beam refinement manager 1165 may also be used to perform a beam refinement procedure with the network access device based at least in part on a set of multiple transmit beams identified by the indication of the one or more sets of multiple transmit beams, as described with reference to FIGS. 6-8.

Figure 12:
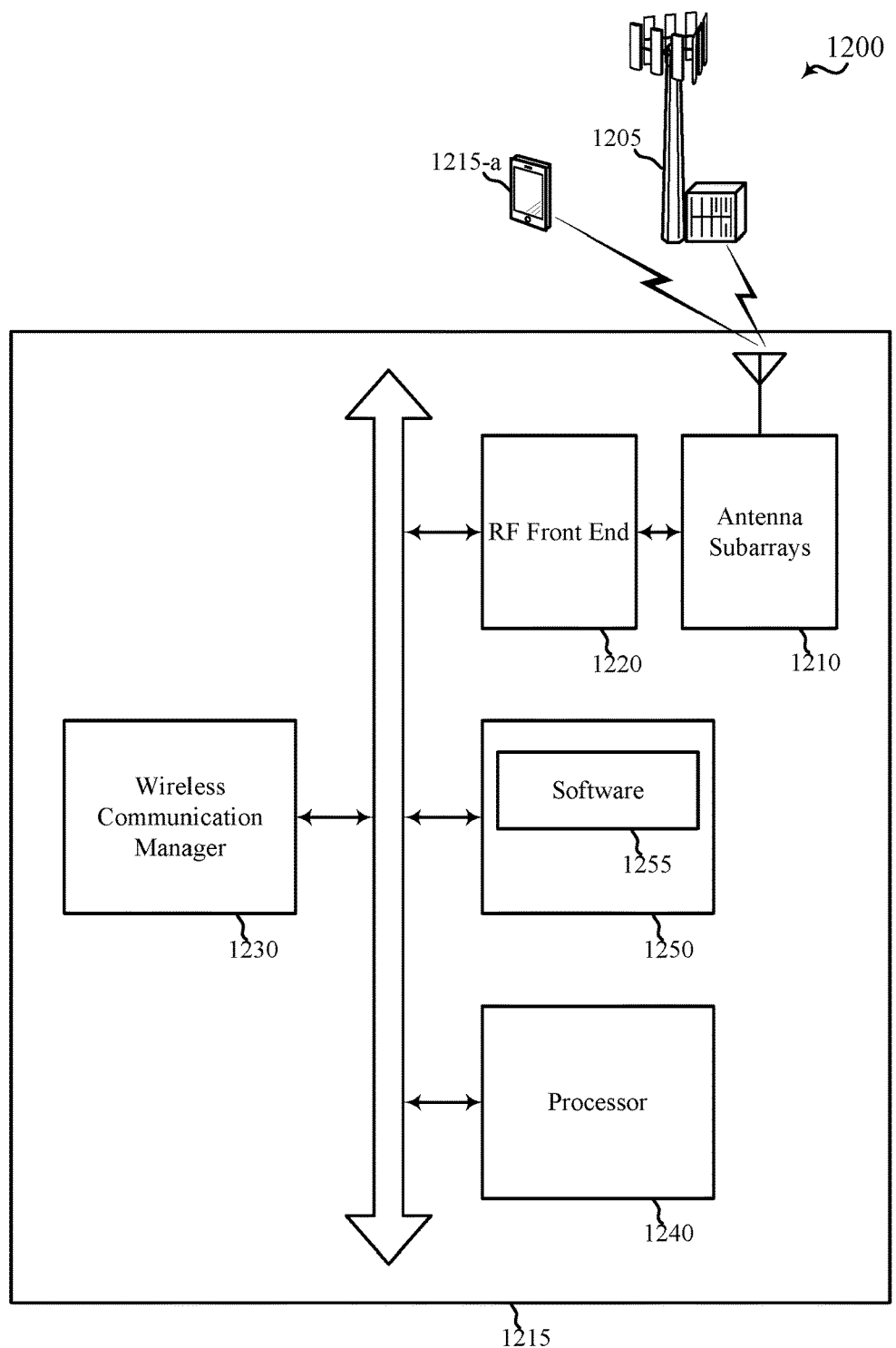
FIG. 12 shows a diagram of a wireless communications system, in accordance with aspects of the present disclosure.

FIG. 12 shows a diagram of a wireless communications system 1200, in accordance with aspects of the present disclosure. The wireless communications system 1200 may include a UE 1215, which may be an example of aspects of the UEs or apparatuses as described with reference to FIGS. 1-10.

The UE 1215 may include a wireless communication manager 1230, memory 1250, a processor 1240, an RF front end 1220, and antenna subarrays 1210. Each of these components may communicate, directly or indirectly, with one another (e.g., via one or more buses). The antenna subarrays 1210 may be an example of aspects of the antenna subarrays as described with reference to FIGS. 2-10. The RF front end 1220 may be an example of aspects of the RF front ends, switches (or other elements), and TXRUs as described with reference to FIGS. 2-10. The wireless communication manager 1230 may be an example of aspects of the wireless communication managers as described with reference to FIGS. 1 and 9-11.

The memory 1250 may include random access memory (RAM) or read only memory (ROM). The memory 1250 may store computer-readable, computer-executable software 1255 including instructions that, when executed, cause the processor 1240 to perform various functions described herein (e.g., receiving a beam training sequence transmitted by a network access device on a plurality of transmit beams, identifying, based at least in part on the received beam training sequence, one or more sets of multiple transmit beams that are compatible with at least one configuration for routing signals between the antenna subarrays 910 and TXRUs of the UE 1215, and transmitting, to the network access device, an indication of the identified one or more sets of multiple transmit beams, etc.). In some cases, the software 1255 may not be directly executable by the processor 1240 but may cause the processor 1240 (e.g., when compiled and executed) to perform functions described herein. The processor 1240 may include an intelligent hardware device, (e.g., a central processing unit (CPU), a microcontroller, an application specific integrated circuit (ASIC), etc.).

The RF front end 1220 may be configured for bi-directional communication, via one or more antenna subarrays or wired links, with one or more networks, as described herein. For example, the RF front end 1220 may be configured for bi-directional communication with a base station 1205 or another UE 1215-*a*. The wireless communication manager 1230 may include a modem to modulate packets and provide the modulated packets to the antenna subarrays 1210, via the RF front end 1220, for transmission, and to demodulate packets received from the antenna subarrays 1210 via the RF front end 1220.

Figure 13:
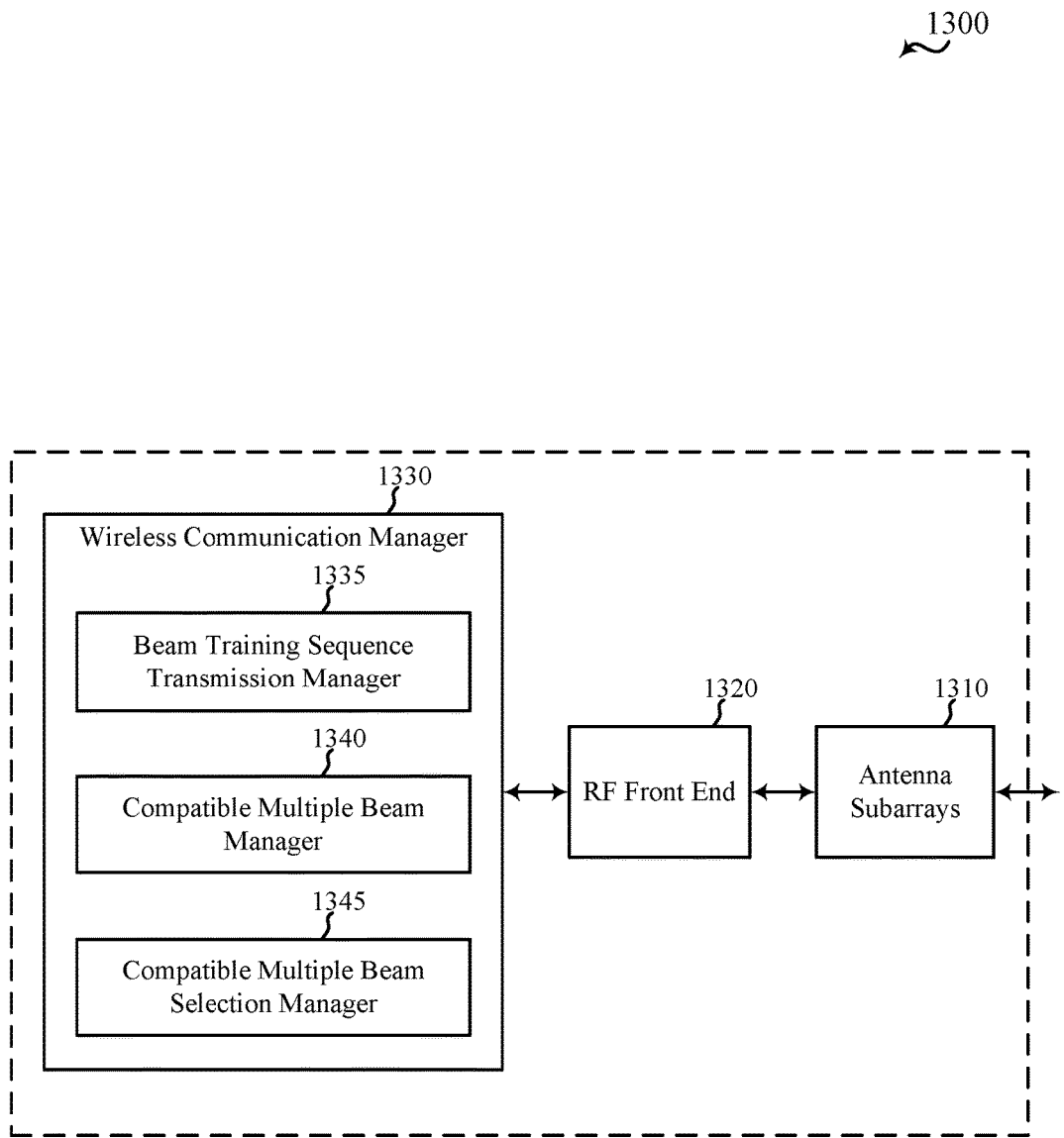
FIG. 13 shows a block diagram of an apparatus that supports wireless communication at a network access device, in accordance with aspects of the present disclosure.

FIG. 13 shows a block diagram of an apparatus 1300 that supports wireless communication at a network access device, in accordance with aspects of the present disclosure. The apparatus 1300 may be an example of aspects of the network access devices or apparatus as described with reference to FIGS. 1-9. The apparatus 1300 may include antenna subarrays 1310, an RF front end 1320, and a wireless communication manager 1330. The apparatus 1300 may also include a processor. Each of these components may be in communication with each other.

The antenna subarrays 1310 may include antenna subarrays for receiving or transmitting signals (e.g., synchronization signals or reference signals) or information (e.g., control information or user data) associated with various channels (e.g., control channels, data channels, broadcast channels, multicast channels, unicast channels, etc.). The antenna subarrays 1310 may be capable of receiving or transmitting one or more beams over a RF spectrum. Received signals and information may be used by the RF front end 1320 (e.g., for frequency/time tracking) or passed to other components of the apparatus 1300, including the wireless communication manager 1330. The antenna subarrays 1310 may be an example of aspects of the antenna subarrays as described with reference to FIGS. 2-9, and 15. The RF front end 1320 may be an example of aspects of the RF front ends, switches (or other elements), and TXRUs as described with reference to FIGS. 2-9, and 15.

The wireless communication manager 1330 may be used to manage one or more aspects of wireless communication for the apparatus 1300, and in some cases may include a modem. In some examples, the wireless communication manager 1330 may be an example of aspects of the wireless communication manager as described with reference to FIG. 1, 9, or 15. The wireless communication manager 1330 may include a beam training sequence transmission manager 1335, a compatible multiple beam manager 1340, and a compatible multiple beam selection manager 1345.

The beam training sequence transmission manager 1335 may be used to transmit a beam training sequence to a UE on a plurality of transmit beams, as described with reference to FIGS. 3 and 4.

The compatible multiple beam manager 1340 may be used to receive, from the UE, an indication of one or more sets of multiple transmit beams that are compatible with at least one configuration for routing signals between antenna subarrays of the UE and TXRUs of the UE, as described with reference to FIGS. 3 and 4.

The compatible multiple beam selection manager 1345 may be used to select, based at least in part on the received indication, a set of multiple transmit beams of the one or more sets of multiple transmit beams to use to communicate with the UE, as described with reference to FIGS. 3, 4, and 6-8.

Figure 14:
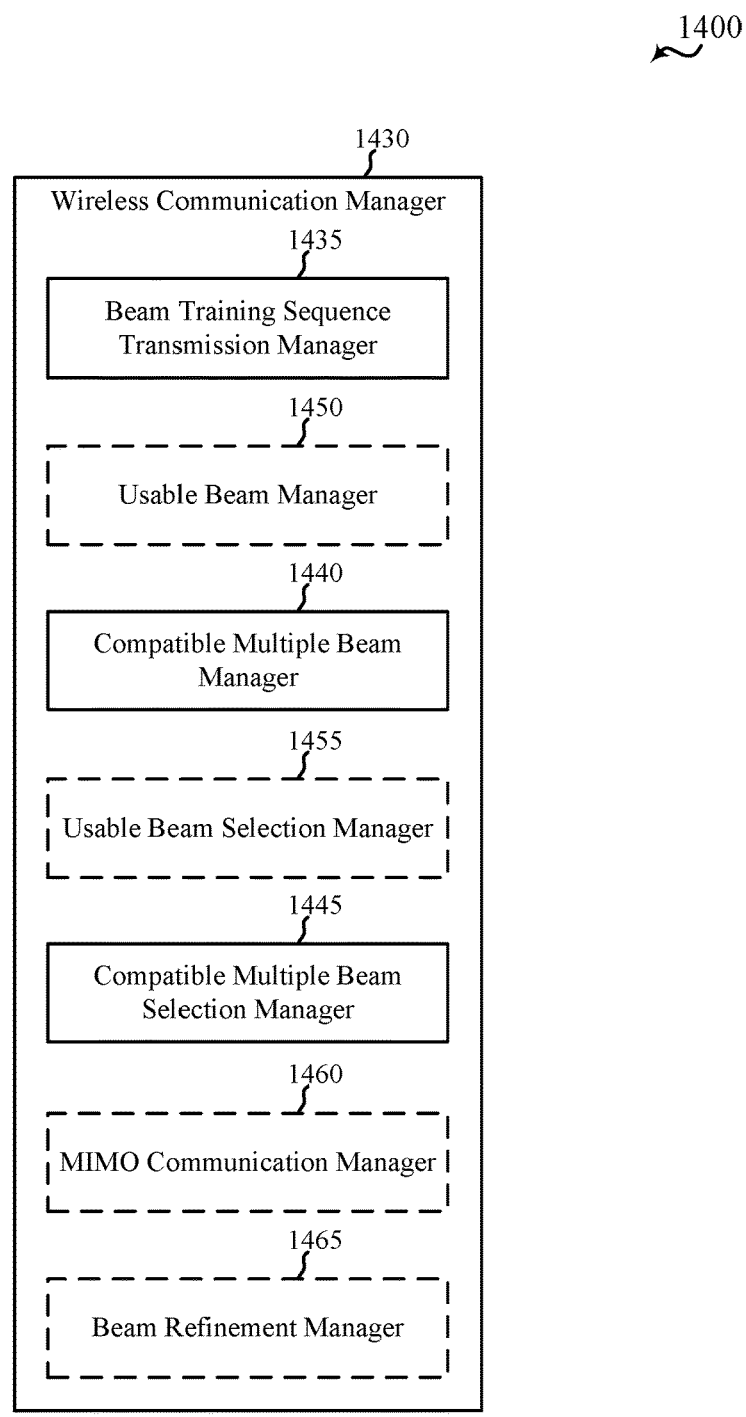
FIG. 14 shows a block diagram of a wireless communication manager, in accordance with aspects of the present disclosure.

FIG. 14 shows a block diagram of a wireless communication manager 1430, in accordance with aspects of the present disclosure. The wireless communication manager 1430 may be an example of aspects of the wireless communication managers as described with reference to FIG. 1, 9, 13, or 15, and may be included in a network access device such as one of the network access devices as described with reference to FIGS. 1-8 and 15.

The wireless communication manager 1430 may include a beam training sequence transmission manager 1435, an optional usable beam manager 1450, a compatible multiple beam manager 1440, an optional usable beam selection manager 1455, a compatible multiple beam selection manager 1445, an optional MIMO communication manager 1460, and an optional beam refinement manager 1465. Each of these components may communicate, directly or indirectly, with one another (e.g., via one or more buses).

The beam training sequence transmission manager 1435, compatible multiple beam manager 1440, and compatible multiple beam selection manager 1445 may be examples of aspects of the beam training sequence transmission manager 1335, compatible multiple beam manager 1340, and compatible multiple beam selection manager 1345 as described with reference to FIG. 13.

The usable beam manager 1450 may be used to receive, from a UE, an indication of one or more transmit beams usable for communication between a network access device including the wireless communication manager 1430 and the UE, as described with reference to FIG. 2.

The usable beam selection manager 1455 may be used to select, based at least in part on the received indication of one or more transmit beams usable for communication between the network access device including the wireless communication manager 1430 and the UE, at least one transmit beam to use to communicate with the UE, as described with reference to FIG. 2.

The MIMO communication manager 1460 may be used to communicate with the UE using a MIMO transmission based at least in part on the selected set of multiple transmit beams, as described with reference to FIGS. 3 and 4.

The beam refinement manager 1465 may be used to perform a beam refinement procedure with the UE based at least in part on the selected set of multiple transmit beams, as described with reference to FIGS. 6-8.

Figure 15:
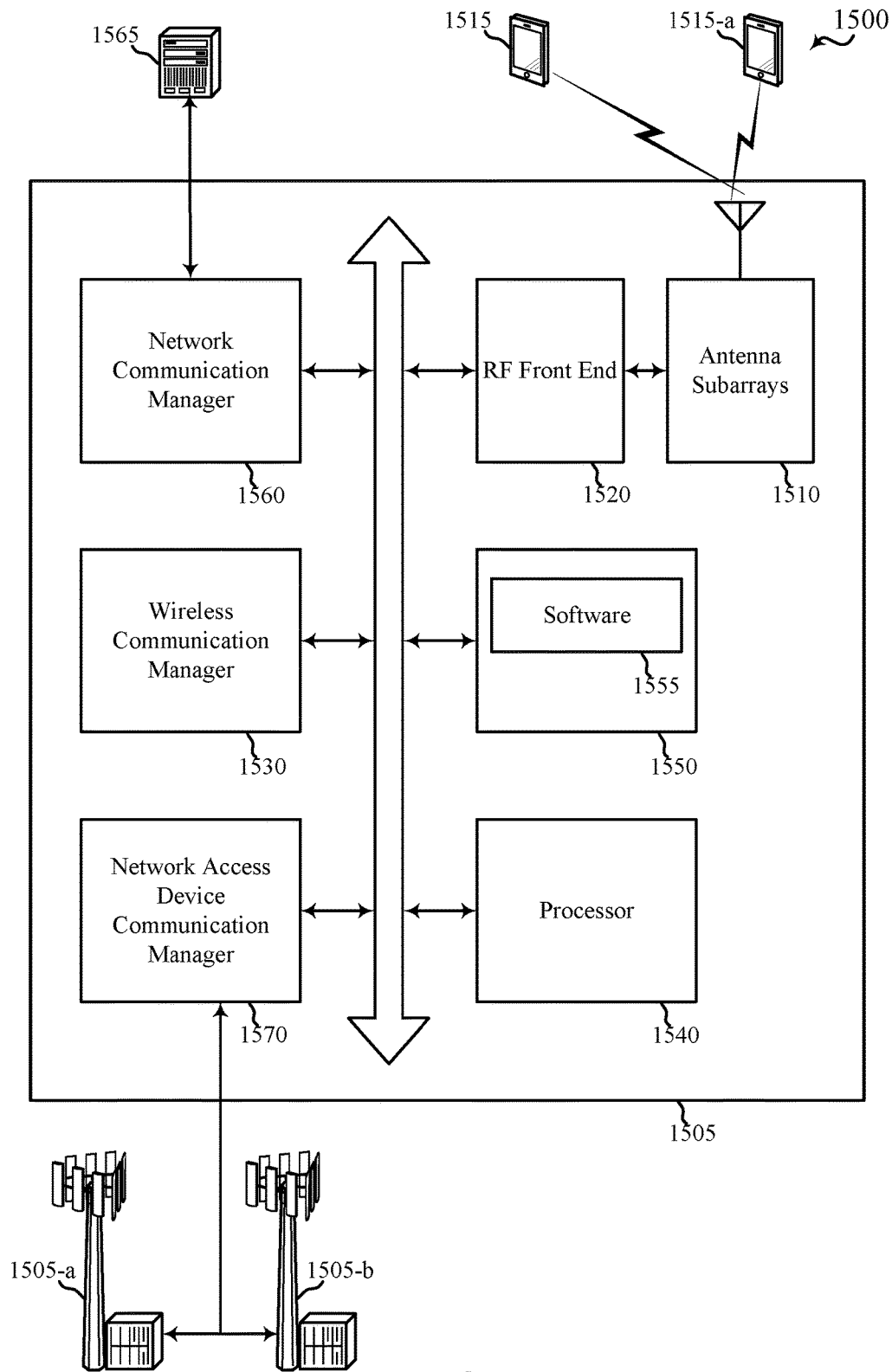
FIG. 15 shows a diagram of a wireless communications system, in accordance with aspects of the present disclosure.

FIG. 15 shows a diagram of a wireless communications system 1500, in accordance with aspects of the present disclosure. The wireless communications system 1500 may include a network access device 1505, which may be an example of aspects of the network access devices or apparatuses as described with reference to FIGS. 1-9 and 13. The network access device 1505 may include components for bi-directional communication with UEs, including components for transmitting communications and components for receiving communications.

The network access device 1505 may include a wireless communication manager 1530, memory 1550, a processor 1540, an RF front end 1520, antenna subarrays 1510, a network access device communication manager 1570, and a network communication manager 1560. Each of these components may communicate, directly or indirectly, with one another (e.g., via one or more buses). The antenna subarrays 1510 may be an example of aspects of the antenna subarrays as described with reference to FIGS. 2-9 and 13. The RF front end 1520 may be an example of aspects of the RF front end as described with reference to FIG. 13. The wireless communication manager 1530 may be an example of aspects of the wireless communication managers as described with reference to FIGS. 1, 9, 13, and 14.

The memory 1550 may include RAM or ROM. The memory 1550 may store computer-readable, computer-executable software 1555 including instructions that, when executed, cause the processor 1540 to perform various functions described herein (e.g., transmitting a beam training sequence to a UE on a plurality of transmit beams, receiving, from the UE, an indication of one or more sets of multiple transmit beams that are compatible with at least one configuration for routing signals between antenna subarrays of the UE and TXRUs of the UE, and selecting, based at least in part on the received indication, a set of multiple transmit beams of the one or more sets of multiple transmit beams to use to communicate with the UE, etc.). In some cases, the software 1555 may not be directly executable by the processor 1540 but may cause the processor 1540 (e.g., when compiled and executed) to perform functions described herein. The processor 1540 may include an intelligent hardware device, (e.g., a CPU, a microcontroller, an ASIC, etc.).

The RF front end 1520 may be configured bi-directional communication, via one or more antenna subarrays or wired links, with one or more networks, as described herein. For example, the RF front end 1520 may be configured for bi-directional communication with a UE 1515 or UE 1515-*a*. The wireless communication manager 1530 may include a modem to modulate packets and provide the modulated packets to the antenna subarrays 1510, via the RF front end 1520, for transmission, and to demodulate packets received from the antenna subarrays 1510 via the RF front end 1520.

The network access device communication manager 1570 may manage communications with other network access devices (e.g., network access devices 1505-*a* or 1505-*b*). In some examples, the network access device communication manager 1570 may provide an X2 interface to provide communication between network access devices 1505.

The network communication manager 1560 may manage communications with a core network 1565 (e.g., via one or more wired or wireless links). For example, the network communication manager 1560 may manage the transfer of data between UEs 115 and the core network 1565.

Figure 16:
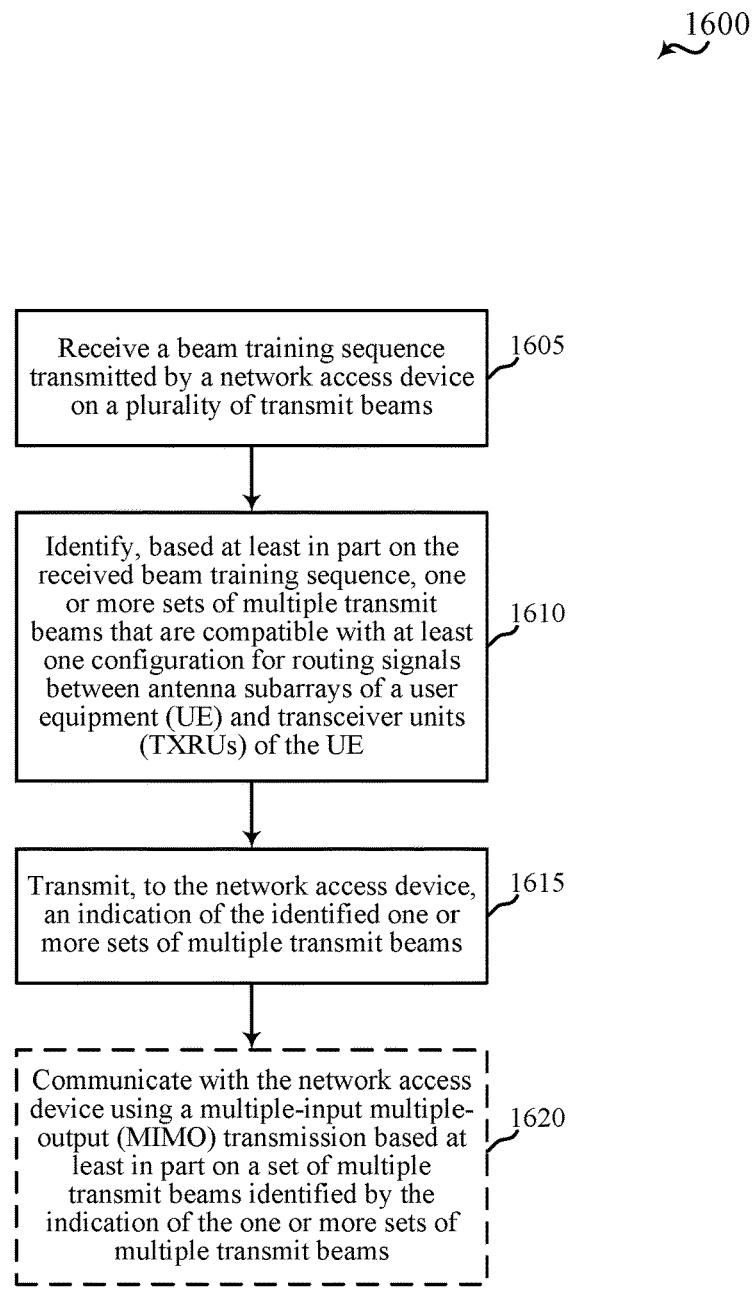
FIG. 16 shows a flowchart illustrating a method for wireless communication at a UE, in accordance with aspects of the present disclosure.

FIG. 16 shows a flowchart illustrating a method 1600 for wireless communication at a UE, in accordance with aspects of the present disclosure. The operations of method 1600 may be performed by a UE or its components, as described with reference to FIGS. 1, 3, 4, and 6-12. In some examples, the operations of method 1600 may be performed by the wireless communication manager as described with reference to FIGS. 1 and 9-12. In some examples, a UE may execute a set of codes to control the functional elements of the UE to perform the functions described below. Additionally or alternatively, a UE may perform aspects of the functions described below using special-purpose hardware.

At block 1605, a UE may receive a beam training sequence transmitted by a network access device on a plurality of transmit beams, as described with reference to FIGS. 3 and 4. In certain examples, the operations of block 1605 may be performed using the beam training sequence reception manager as described with reference to FIGS. 10 and 11.

At block 1610, the UE may identify one or more sets of multiple transmit beams that are compatible with at least one configuration for routing signals between antenna subarrays of the UE and TXRUs of the UE, as described with reference to FIGS. 3 and 4. The one or more sets of multiple transmit beams may be identified based at least in part on the beam training sequence received at block 1605. In some examples, identifying the one or more sets of multiple transmit beams may include identifying, based at least in part on the received beam training sequence, a first set of multiple transmit beams usable to provide RF communication multiplexing, a second set of multiple transmit beams usable to provide RF communication diversity, or a combination thereof. In some examples, identifying the one or more sets of multiple transmit beams may include identifying the one or more sets of multiple transmit beams based at least in part on a RF architecture of the UE, a MIMO transmission mode, signal strengths for the plurality of transmit beams, or a combination thereof. In some examples, identifying the one or more sets of multiple transmit beams based at least in part on the RF architecture of the UE may include identifying the one or more sets of multiple transmit beams based at least in part on alternative configurations for routing signals between antenna subarrays of the UE and TXRUs of the UE, a first capability of the UE to combine beams in an analog domain, a second capability of the UE to combine beams in a digital domain, or a combination thereof. In certain examples, the operations of block 1610 may be performed using the compatible multiple beam identifier as described with reference to FIGS. 10 and 11.

At block 1615, the UE may transmit, to the network access device, an indication of the identified one or more sets of multiple transmit beams, as described with reference to FIGS. 3 and 4. In some examples, the indication of the identified one or more sets of multiple transmit beams may include at least a first indication of the identified one or more sets of multiple transmit beams, or a second indication of one or more sets of multiple transmit beams that are incompatible with any configuration for routing signals between antenna subarrays of the UE and TXRUs of the UE, or a third indication, for each received beam of the plurality of transmit beams, of a set of one or more TXRUs of the UE usable to receive the beam, or a fourth indication, for each received beam of the plurality of transmit beams, of a set of one or more TXRUs of the UE and associated routing configuration parameters of the UE usable to receive the beam, or a combination thereof. In some examples, transmitting the indication of the identified one or more sets of multiple transmit beams may include transmitting the indication of the identified one or more sets of multiple transmit beams to the network access device on a channel associated with a lower frequency than one or more frequencies associated with the plurality of transmit beams. In certain examples, the operations of block 1615 may be performed using the compatible multiple beam indication manager as described with reference to FIGS. 10 and 11.

At block 1620, the UE may optionally communicate with the network access device using a MIMO transmission based at least in part on a set of multiple transmit beams identified by the indication of the one or more sets of multiple transmit beams, as described with reference to FIGS. 3 and 4. In certain examples, the operations of block 1620 may be performed using the MIMO communication manager as described with reference to FIG. 11.

Figure 17:
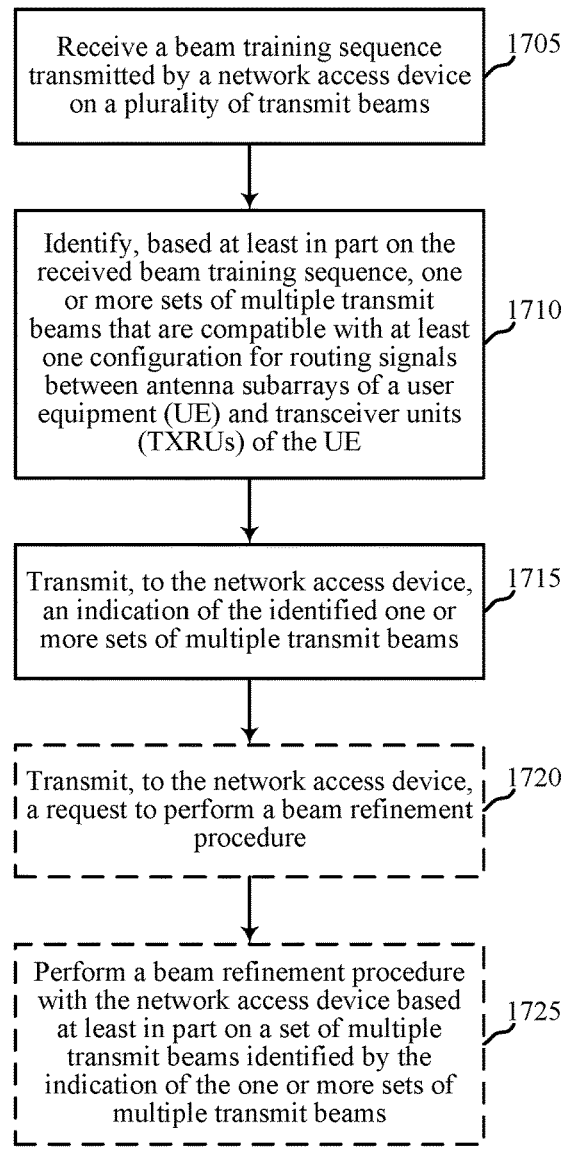
FIG. 17 shows a flowchart illustrating a method for wireless communication at a UE, in accordance with aspects of the present disclosure.

FIG. 17 shows a flowchart illustrating a method 1700 for wireless communication at a UE, in accordance with aspects of the present disclosure. The operations of method 1700 may be performed by a UE or its components, as described with reference to FIGS. 1, 3, 4, and 6-12. In some examples, the operations of method 1700 may be performed by the wireless communication manager as described with reference to FIGS. 1 and 9-12. In some examples, a UE may execute a set of codes to control the functional elements of the UE to perform the functions described below. Additionally or alternatively, a UE may perform aspects of the functions described below using special-purpose hardware.

At block 1705, a UE may receive a beam training sequence transmitted by a network access device on a plurality of transmit beams, as described with reference to FIGS. 3 and 4. In certain examples, the operations of block 1705 may be performed using the beam training sequence reception manager as described with reference to FIGS. 10 and 11.

At block 1710, the UE may identify one or more sets of multiple transmit beams that are compatible with at least one configuration for routing signals between antenna subarrays of the UE and TXRUs of the UE, as described with reference to FIGS. 3 and 4. The one or more sets of multiple transmit beams may be identified based at least in part on the beam training sequence received at block 1705. In some examples, identifying the one or more sets of multiple transmit beams may include identifying, based at least in part on the received beam training sequence, a first set of multiple transmit beams usable to provide RF communication multiplexing, a second set of multiple transmit beams usable to provide RF communication diversity, or a combination thereof. In some examples, identifying the one or more sets of multiple transmit beams may include identifying the one or more sets of multiple transmit beams based at least in part on a RF architecture of the UE, a MIMO transmission mode, signal strengths for the plurality of transmit beams, or a combination thereof. In some examples, identifying the one or more sets of multiple transmit beams based at least in part on the RF architecture of the UE may include identifying the one or more sets of multiple transmit beams based at least in part on alternative configurations for routing signals between antenna subarrays of the UE and TXRUs of the UE, a first capability of the UE to combine beams in an analog domain, a second capability of the UE to combine beams in a digital domain, or a combination thereof. In certain examples, the operations of block 1710 may be performed using the compatible multiple beam identifier as described with reference to FIGS. 10 and 11.

At block 1715, the UE may transmit, to the network access device, an indication of the identified one or more sets of multiple transmit beams, as described with reference to FIGS. 3 and 4. In some examples, the indication of the identified one or more sets of multiple transmit beams may include at least a first indication of the identified one or more sets of multiple transmit beams, or a second indication of one or more sets of multiple transmit beams that are incompatible with any configuration for routing signals between antenna subarrays of the UE and TXRUs of the UE, or a third indication, for each received beam of the plurality of transmit beams, of a set of one or more TXRUs of the UE usable to receive the beam, or a fourth indication, for each received beam of the plurality of transmit beams, of a set of one or more TXRUs of the UE and associated routing configuration parameters of the UE usable to receive the beam, or a combination thereof. In some examples, transmitting the indication of the identified one or more sets of multiple transmit beams may include transmitting the indication of the identified one or more sets of multiple transmit beams to the network access device on a channel associated with a lower frequency than one or more frequencies associated with the plurality of transmit beams. In certain examples, the operations of block 1715 may be performed using the compatible multiple beam indication manager as described with reference to FIGS. 10 and 11.

At block 1720, the UE may optionally transmit, to the network access device, a request to perform a beam refinement procedure, as described with reference to FIGS. 6-8. In certain examples, the operations of block 1720 may be performed using the beam refinement manager as described with reference to FIG. 11.

At block 1725, the UE may optionally perform a beam refinement procedure with the network access device based at least in part on a set of multiple transmit beams identified by the indication of the one or more sets of multiple beams, as described with reference to FIGS. 6-8. In certain examples, the operations of block 1725 may be performed using the beam refinement manager as described with reference to FIG. 11.

Figure 18:
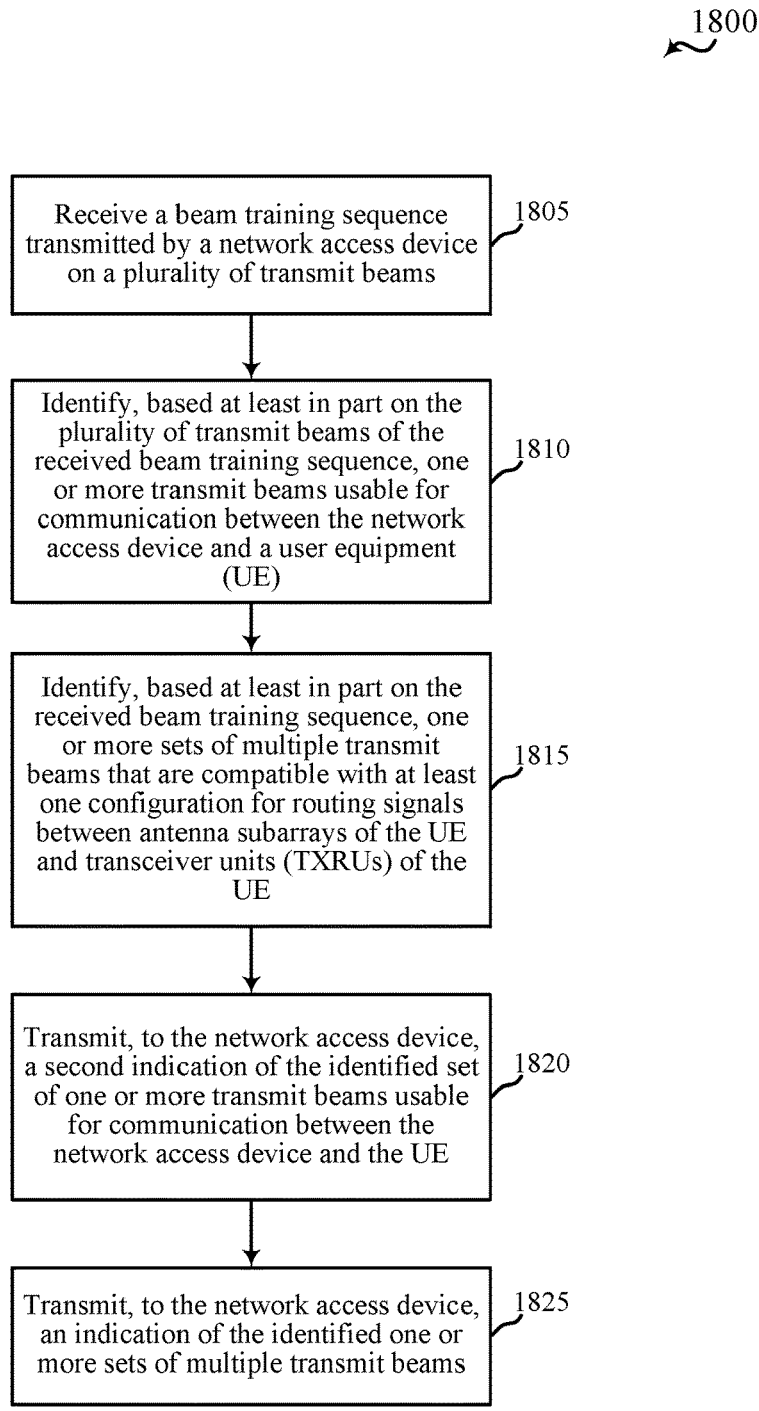
FIG. 18 shows a flowchart illustrating a method for wireless communication at a UE, in accordance with aspects of the present disclosure.

FIG. 18 shows a flowchart illustrating a method 1800 for wireless communication at a UE, in accordance with aspects of the present disclosure. The operations of method 1800 may be performed by a UE or its components, as described with reference to FIGS. 1, 3, 4, and 6-12. In some examples, the operations of method 1800 may be performed by the wireless communication manager as described with reference to FIGS. 1 and 9-12. In some examples, a UE may execute a set of codes to control the functional elements of the UE to perform the functions described below. Additionally or alternatively, a UE may perform aspects of the functions described below using special-purpose hardware.

At block 1805, a UE may receive a beam training sequence transmitted by a network access device on a plurality of transmit beams, as described with reference to FIGS. 3 and 4. In certain examples, the operations of block 1805 may be performed using the beam training sequence reception manager as described with reference to FIGS. 10 and 11.

block 1810, the UE may identify, based at least in part on the plurality of transmit beams of the beam training sequence received at block 1805, one or more transmit beams usable for communication between the network access device and the UE, as described with reference to FIG. 2. In certain examples, the operations of block 1810 may be performed using the usable beam identifier as described with reference to FIG. 11.

At block 1815, the UE may identify one or more sets of multiple beams that are compatible with at least one configuration for routing signals between antenna subarrays of the UE and TXRUs of the UE, as described with reference to FIGS. 3 and 4. The one or more sets of multiple transmit beams may be identified based at least in part on the beam training sequence received at block 1805. In some examples, identifying the one or more sets of multiple transmit beams may include identifying, based at least in part on the received beam training sequence, a first set of multiple transmit beams usable to provide RF communication multiplexing, a second set of multiple transmit beams usable to provide RF communication diversity, or a combination thereof. In some examples, identifying the one or more sets of multiple transmit beams may include identifying the one or more sets of multiple transmit beams based at least in part on a RF architecture of the UE, a MIMO transmission mode, signal strengths for the plurality of transmit beams, or a combination thereof. In some examples, identifying the one or more sets of multiple transmit beams based at least in part on the RF architecture of the UE may include identifying the one or more sets of multiple transmit beams based at least in part on alternative configurations for routing signals between antenna subarrays of the UE and TXRUs of the UE, a first capability of the UE to combine beams in an analog domain, a second capability of the UE to combine beams in a digital domain, or a combination thereof. In certain examples, the operations of block 1815 may be performed using the compatible multiple beam identifier as described with reference to FIGS. 10 and 11.

At block 1820, the UE may transmit, to the network access device, an indication of the identified set of one or more transmit beams usable for communication between the network access device and the UE, as described with reference to FIG. 2. In certain examples, the operations of block 1820 may be performed using the usable beam indication manager as described with reference to FIG. 11.

At block 1825, the UE may transmit, to the network access device, an indication of the identified one or more sets of multiple transmit beams, as described with reference to FIGS. 3 and 4. In some examples, the indication of the identified one or more sets of multiple transmit beams may include at least a first indication of the identified one or more sets of multiple transmit beams, or a second indication of one or more sets of multiple transmit beams that are incompatible with any configuration for routing signals between antenna subarrays of the UE and TXRUs of the UE, or a third indication, for each received beam of the plurality of transmit beams, of a set of one or more TXRUs of the UE usable to receive the beam, or a fourth indication, for each received beam of the plurality of transmit beams, of a set of one or more TXRUs of the UE and associated routing configuration parameters of the UE usable to receive the beam, or a combination thereof. In some examples, transmitting the indication of the identified one or more sets of multiple transmit beams may include transmitting the indication of the identified one or more sets of multiple transmit beams to the network access device on a channel associated with a lower frequency than one or more frequencies associated with the plurality of transmit beams. In certain examples, the operations of block 1825 may be performed using the compatible multiple beam indication manager as described with reference to FIGS. 10 and 11.

Figure 19:
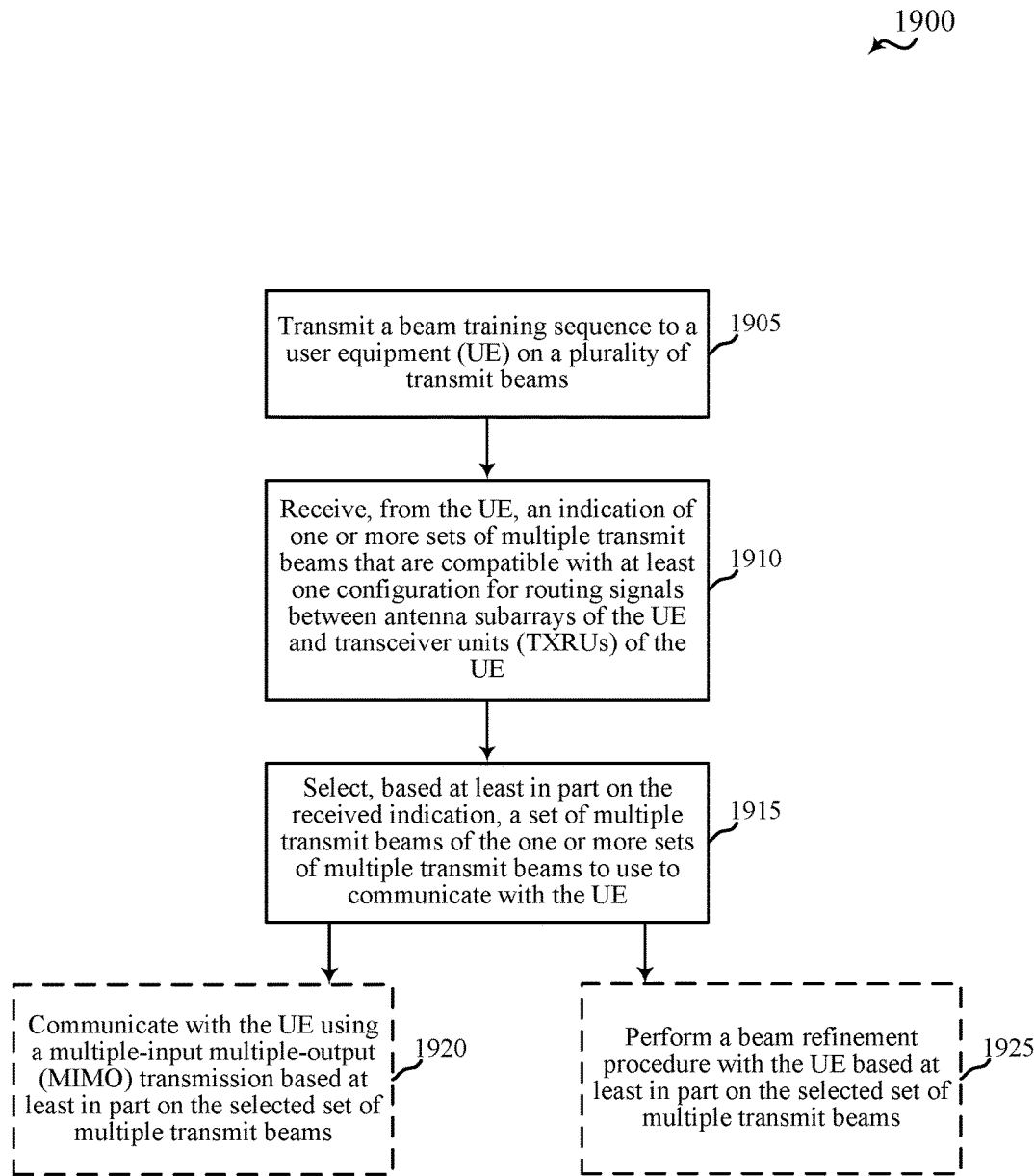
FIG. 19 shows a flowchart illustrating a method for wireless communication at a network access device, in accordance with aspects of the present disclosure.

FIG. 19 shows a flowchart illustrating a method 1900 for wireless communication at a network access device, in accordance with aspects of the present disclosure. The operations of method 1900 may be performed by a network access device or its components, as described with reference to FIGS. 1, 3, 4, 6-9, and 13-15. In some examples, the operations of method 1900 may be performed by the wireless communication manager as described with reference to FIGS. 1, 9, and 13-15. In some examples, a network access device may execute a set of codes to control the functional elements of the network access device to perform the functions described below. Additionally or alternatively, a network access device may perform aspects of the functions described below using special-purpose hardware.

At block 1905, a network access device may transmit a beam training sequence to a UE on a plurality of transmit beams, as described with reference to FIGS. 3 and 4. In certain examples, the operations of block 1905 may be performed using the beam training sequence transmission manager as described with reference to FIGS. 13 and 14.

At block 1910, the network access device may receive, from the UE, an indication of one or more sets of multiple transmit beams that are compatible with at least one configuration for routing signals between antenna subarrays of the UE and TXRUs of the UE, as described with reference to FIGS. 3 and 4. In certain examples, the operations of block 1910 may be performed using the compatible multiple beam manager as described with reference to FIGS. 13 and 14.

At block 1915, the network access device may select, based at least in part on the received indication, a set of multiple transmit beams of the one or more sets of multiple transmit beams to use to communicate with the UE, as described with reference to FIGS. 3, 4, and 6-8. In certain examples, the operations of block 1915 may be performed using the compatible multiple beam selection manager as described with reference to FIGS. 13 and 14.

At block 1920 or 1925, the network access device may optionally communicate with the UE using a MIMO transmission based at least in part on the selected set of multiple transmit beams (at block 1920), or perform a beam refinement procedure with the UE based at least in part on the selected set of multiple transmit beams (at block 1925), as described with reference to FIGS. 3, 4, and 6-8. In certain examples, the operations of block 1920 may be performed using the MIMO communication manager as described with reference to FIG. 14, or the operations of block 1925 may be performed using the beam refinement manager as described with reference to FIG. 14.

The methods described above illustrate possible implementations of the techniques described in the present disclosure. In some examples, aspects from two or more of the methods 1600, 1700, and/or 1800 as described with reference to FIGS. 16, 17, and 18 may be combined. In some examples, the operations of the methods may be performed in different orders or include different operations. In some examples, aspects of one of the methods may include steps or aspects of one or more of the other methods, or other steps or techniques described herein.

Techniques described herein may be used for various wireless communications systems such as CDMA, time-division multiple access (TDMA), frequency-division multiple access (FDMA), orthogonal frequency-division multiple access (OFDMA), SC-FDMA, and other systems. The terms "system" and "network" are often used interchangeably. A CDMA system may implement a radio technology such as CDMA2000, UTRA, etc. CDMA2000 covers IS-2000, IS-95, and IS-856 standards. IS-2000 Releases 0 and A may be referred to as CDMA2000 1x, 1x, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C).

As used herein, the phrase "based on" shall not be construed as a reference to a closed set of conditions. For example, an exemplary feature that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method for wireless communication at a user equipment (UE), comprising:
   receiving a beam training sequence transmitted by a network access device on a plurality of transmit beams;
   identifying, based at least in part on the received beam training sequence, one or more sets of multiple transmit beams that are compatible with at least one configuration of the UE of a plurality of configurations for routing signals between antenna subarrays of the UE and transceiver units (TXRUs) of the UE, at least a first configuration and a second configuration of the plurality of configurations connecting different antenna subarrays of the UE to different TXRUs of the UE; and
   transmitting, to the network access device, an indication of the identified one or more sets of multiple transmit beams.

2. The method of claim 1, further comprising communicating with the network access device using a multiple-input multiple-output (MIMO) transmission based at least in part on a set of multiple transmit beams identified by the indication of the one or more sets of multiple transmit beams.

3. The method of claim 1, further comprising performing a beam refinement procedure with the network access device based at least in part on a set of multiple transmit beams identified by the indication of the one or more sets of multiple transmit beams.

4. The method of claim 3, further comprising transmitting, to the network access device, a request to perform the beam refinement procedure.

5. The method of claim 1, wherein identifying the one or more sets of multiple transmit beams comprises identifying, based at least in part on the received beam training sequence, a first set of multiple transmit beams usable to provide radio frequency (RF) communication multiplexing, a second set of multiple transmit beams usable to provide RF communication diversity, or a combination thereof.

6. The method of claim 1, wherein the indication of the identified one or more sets of multiple transmit beams comprises at least:
   a first indication of the identified one or more sets of multiple transmit beams; or
   a second indication of one or more sets of multiple transmit beams that are incompatible with any configuration of the plurality of configurations for routing signals between antenna subarrays of the UE and TXRUs of the UE; or
   a third indication, for each received beam of the plurality of transmit beams, of a set of one or more TXRUs of the UE usable to receive a beam; or
   a fourth indication, for each received beam of the plurality of transmit beams, of a set of one or more TXRUs of the UE and associated routing configuration parameters of the UE usable to receive the beam; or
   a combination thereof.

7. The method of claim 1, wherein transmitting the indication of the identified one or more sets of multiple transmit beams comprises transmitting the indication of the identified one or more sets of multiple transmit beams to the network access device on a channel associated with a lower frequency than one or more frequencies associated with the plurality of transmit beams.

8. The method of claim 1, wherein identifying the one or more sets of multiple transmit beams comprises identifying the one or more sets of multiple transmit beams based at least in part on a radio frequency (RF) architecture of the UE, a multiple-input multiple-output (MIMO) transmission mode, signal strengths for the plurality of transmit beams, or a combination thereof.

9. The method of claim 8, wherein identifying the one or more sets of multiple transmit beams based at least in part on the RF architecture of the UE comprises identifying the one or more sets of multiple transmit beams based at least in part on alternative configurations for routing signals between antenna subarrays of the UE and TXRUs of the UE, a first capability of the UE to combine beams in an analog domain, a second capability of the UE to combine beams in a digital domain, or a combination thereof.

10. The method of claim 1, further comprising:
identifying, based at least in part on the plurality of transmit beams of the received beam training sequence, one or more transmit beams usable for communication between the network access device and the UE; and
transmitting, to the network access device, a second indication of the identified set of one or more transmit beams usable for communication between the network access device and the UE.

11. The method of claim 1, wherein the one or more sets of multiple transmit beams is usable in a receive configuration for routing signals between antenna subarrays of the UE and TXRUs of the UE, a transmit configuration for routing signals between TXRUs of the UE and antenna subarrays of the UE, or a combination thereof.

12. The method of claim 1, wherein the first configuration routes signals between a first set of antenna subarrays and the TXRUs, the second configuration routes signals between a second set of antenna subarrays and the TXRUs, and at least one antenna subarray of the first set of antenna subarrays is different than each antenna subarray of the second set of antenna subarrays.

13. A method for wireless communication at a network access device, comprising:
transmitting a beam training sequence to a user equipment (UE) on a plurality of transmit beams;
receiving, from the UE, an indication of one or more sets of multiple transmit beams that are compatible with at least one configuration of the UE of a plurality of configurations for routing signals between antenna subarrays of the UE and transceiver units (TXRUs) of the UE, at least a first configuration and a second configuration of the plurality of configurations connecting different antenna subarrays of the UE to different TXRUs of the UE; and
selecting, based at least in part on the received indication, a set of multiple transmit beams of the one or more sets of multiple transmit beams to use to communicate with the UE.

14. The method of claim 13, further comprising communicating with the UE using a multiple-input multiple-output (MIMO) transmission based at least in part on the selected set of multiple transmit beams.

15. The method of claim 13, further comprising performing a beam refinement procedure with the UE based at least in part on the selected set of multiple transmit beams.

16. The method of claim 15, further comprising receiving, from the UE, a request to perform the beam refinement procedure.

17. An apparatus for wireless communication, comprising:
a processor;
memory in electronic communication with the processor; and
instructions stored in the memory and executable by the processor to cause the apparatus to:
receive a beam training sequence transmitted by a network access device on a plurality of transmit beams;
identify, based at least in part on the received beam training sequence, one or more sets of multiple transmit beams that are compatible with at least one configuration of the apparatus of a plurality of configurations for routing signals between antenna subarrays of the apparatus and transceiver units (TXRUs) of the apparatus, at least a first configuration and a second configuration of the plurality of configurations connecting different antenna subarrays of the apparatus to different TXRUs of the apparatus; and
transmit, to the network access device, an indication of the identified one or more sets of multiple transmit beams.

18. The apparatus of claim 17, wherein the instructions are further executable by the processor to cause the apparatus to communicate with the network access device using a multiple-input multiple-output (MIMO) transmission based at least in part on a set of multiple transmit beams identified by the indication of the one or more sets of multiple transmit beams.

19. The apparatus of claim 17, wherein the instructions are further executable by the processor to cause the apparatus to perform a beam refinement procedure with the network access device based at least in part on a set of multiple transmit beams identified by the indication of the one or more sets of multiple transmit beams.

20. The apparatus of claim 19, wherein the instructions are further executable by the processor to cause the apparatus to transmit, to the network access device, a request to perform the beam refinement procedure.

21. The apparatus of claim 17, wherein the instructions executable by the processor to cause the apparatus to identify the one or more sets of multiple transmit beams comprises:
the instructions executable by the processor to cause the apparatus to identify, based at least in part on the received beam training sequence, a first set of multiple transmit beams usable to provide radio frequency (RF) communication multiplexing, a second set of multiple transmit beams usable to provide RF communication diversity, or a combination thereof.

22. The apparatus of claim 17, wherein the indication of the identified one or more sets of multiple beams comprises at least:
a first indication of the identified one or more sets of multiple transmit beams; or
a second indication of one or more sets of multiple transmit beams that are incompatible with any configuration of the plurality of configurations for routing signals between antenna subarrays of the apparatus and TXRUs of the apparatus; or
a third indication, for each received beam of the plurality of transmit beams, of a set of one or more TXRUs of the apparatus usable to receive a beam; or
a fourth indication, for each received beam of the plurality of transmit beams, of a set of one or more TXRUs of the apparatus and associated routing configuration parameters of the apparatus usable to receive the beam; or
a combination thereof.

23. The apparatus of claim 17, wherein the instructions executable by the processor to cause the apparatus to transmit the indication of the identified one or more sets of multiple beams comprises:
the instructions executable by the processor to cause the apparatus to transmit the indication of the identified one or more sets of multiple transmit beams to the network access device on a channel associated with a lower frequency than one or more frequencies associated with the plurality of transmit beams.

24. The apparatus of claim 17, wherein the instructions executable by the processor to cause the apparatus to identify the one or more sets of multiple transmit beams comprises:

the instructions executable by the processor to cause the apparatus to identify the one or more sets of multiple transmit beams based at least in part on a multiple-input multiple-output (MIMO) transmission mode of the apparatus.

25. The apparatus of claim 24, wherein the instructions executable by the processor to cause the apparatus to identify the one or more sets of multiple transmit beams based at least in part on the RF architecture of the apparatus comprises:

the instructions executable by the processor to cause the apparatus to identify the one or more sets of multiple transmit beams based at least in part on alternative configurations for routing signals between antenna subarrays of the apparatus and TXRUs of the apparatus, a first capability of the apparatus to combine beams in an analog domain, a second capability of the apparatus to combine beams in a digital domain, or a combination thereof.

26. The apparatus of claim 17, wherein the instructions are further executable by the processor to:

identify, based at least in part on the plurality of transmit beams of the received beam training sequence, one or more transmit beams usable for communication between the network access device and the apparatus; and transmit, to the network access device, a second indication of the identified set of one or more transmit beams usable for communication between the network access device and the apparatus.

27. The apparatus of claim 17, wherein the one or more sets of multiple transmit beams is usable in a receive configuration for routing signals between antenna subarrays of the apparatus and TXRUs of the apparatus, a transmit configuration for routing signals between TXRUs of the apparatus and antenna subarrays of the apparatus, or a combination thereof.

28. An apparatus for wireless communication, comprising:

a processor;
memory in electronic communication with the processor; and
instructions stored in the memory and executable by the processor to cause the apparatus to:
transmit a beam training sequence to a user equipment (UE) on a plurality of transmit beams;
receive, from the UE, an indication of one or more sets of multiple transmit beams that are compatible with at least one configuration of the UE of a plurality of configurations for routing signals between antenna subarrays of the UE and transceiver units (TXRUs) of the UE, at least a first configuration and a second configuration of the plurality of configurations connecting different antenna subarrays of the UE to different TXRUs of the UE; and
select, based at least in part on the received indication, a set of multiple transmit beams of the one or more sets of multiple transmit beams to use to communicate with the UE.

29. The apparatus of claim 28, wherein the instructions are further executable by the processor to cause the apparatus to communicate with the UE using a multiple-input multiple-output (MIMO) transmission based at least in part on the selected set of multiple transmit beams.

30. The apparatus of claim 28, wherein the instructions are further executable by the processor to cause the apparatus to perform a beam refinement procedure with the UE based at least in part on the selected set of multiple transmit beams.

31. The apparatus of claim 30, wherein the instructions are further executable by the processor to cause the apparatus to receive, from the UE, a request to perform the beam refinement procedure.

* * * * *